United States Patent
Ishihara et al.

(10) Patent No.: US 10,573,072 B2
(45) Date of Patent: Feb. 25, 2020

(54) IMAGE PROCESSING DEVICE, IMAGE PROCESSING METHOD, AND RECORDING MEDIUM

(71) Applicant: RICOH COMPANY, LTD., Tokyo (JP)

(72) Inventors: Rieko Ishihara, Tokyo (JP); Hiroyuki Yoshida, Tokyo (JP); Takuya Okamoto, Tokyo (JP); Tomoyoshi Takeuchi, Tokyo (JP); Yuki Kawata, Tokyo (JP); Hirotoshi Okumura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 142 days.

(21) Appl. No.: 15/263,583

(22) Filed: Sep. 13, 2016

(65) Prior Publication Data

US 2017/0084081 A1 Mar. 23, 2017

(30) Foreign Application Priority Data

Sep. 17, 2015 (JP) .................................. 2015-184216

(51) Int. Cl.
*G06T 19/00* (2011.01)
*G06T 7/536* (2017.01)
*G06T 3/40* (2006.01)

(52) U.S. Cl.
CPC .............. *G06T 19/006* (2013.01); *G06T 3/40* (2013.01)

(58) Field of Classification Search
CPC ......... G06T 19/006; G06T 7/194; G06T 7/10; G06T 7/70; G06T 7/20; G06T 7/60; G06T 3/40; G06T 7/536

(Continued)

(56) References Cited

U.S. PATENT DOCUMENTS

| 6,633,304 B2 * | 10/2003 | Anabuki .............. G02B 27/017 345/633 |
| 2009/0110241 A1 * | 4/2009 | Takemoto ................ G06K 9/32 382/103 |

(Continued)

FOREIGN PATENT DOCUMENTS

| JP | 2003-248843 | 9/2003 |
| JP | 2016-048456 | 4/2016 |

*Primary Examiner* — Chante E Harrison
(74) *Attorney, Agent, or Firm* — Xsensus LLP

(57) ABSTRACT

An image processing device includes: a setting unit configured to set, as reference straight lines, four straight lines which express sense of perspective in a background image and which pass through four sides constituting a rectangular area in the background image, from among a plurality of straight lines included in the background image; a calculating unit configured to calculate a virtual area in a virtual three-dimensional space, the virtual area corresponding to a rectangular display area which has the four reference lines as four sides; and a display control unit configured to display a superimposition image in which the background image and a two-dimensional original image are superimposed, on a display unit, the two-dimensional original image being formed by projecting a three-dimensional original image which is formed by placing an original image in the virtual area, onto a two-dimensional space visually confirmed from a predetermined viewpoint position.

10 Claims, 17 Drawing Sheets

(58) Field of Classification Search
USPC .................................................. 345/629–635
See application file for complete search history.

(56) References Cited

U.S. PATENT DOCUMENTS

| | | | | |
|---|---|---|---|---|
| 2014/0375684 | A1* | 12/2014 | Algreatly | G06T 19/006 |
| | | | | 345/633 |
| 2016/0063765 | A1 | 3/2016 | Yoshida et al. | |
| 2016/0210784 | A1* | 7/2016 | Ramsby | G06T 19/006 |
| 2017/0236320 | A1* | 8/2017 | Gribetz | G06T 15/00 |
| | | | | 345/419 |
| 2017/0287221 | A1* | 10/2017 | Ghaly | G02B 27/0172 |
| 2017/0352192 | A1* | 12/2017 | Petrovskaya | G06T 7/77 |
| 2017/0372523 | A1* | 12/2017 | Espeset | G11B 27/031 |

* cited by examiner

FIG.3

| LIGHT SOURCE ID | LIGHT SOURCE NAME | LIGHT SOURCE INFORMATION | | |
|---|---|---|---|---|
| | | MIRROR SURFACE LIGHT | DIFFUSION LIGHT | ENVIRONMENTAL LIGHT |
| 1 | SPOTLIGHT | (1.00, 0.95, 0.95) | (1.00, 0.95, 0.95) | (1.00, 0.95, 0.95) |
| 2 | FLUORESCENT LIGHT NEUTRAL WHITE | (1.00, 1.00, 1.00) | (1.00, 1.00, 1.00) | (1.00, 1.00, 1.00) |
| ⋮ | ⋮ | ⋮ | ⋮ | ⋮ |

| POSITION | INITIAL PLACEMENT COORDINATES |
|---|---|
| TOP LEFT | $(-O_x, O_y, 0)$ |
| TOP RIGHT | $(O_x, O_y, 0)$ |
| BOTTOM LEFT | $(-O_x, -O_y, 0)$ |
| BOTTOM RIGHT | $(O_x, -O_y, 0)$ |

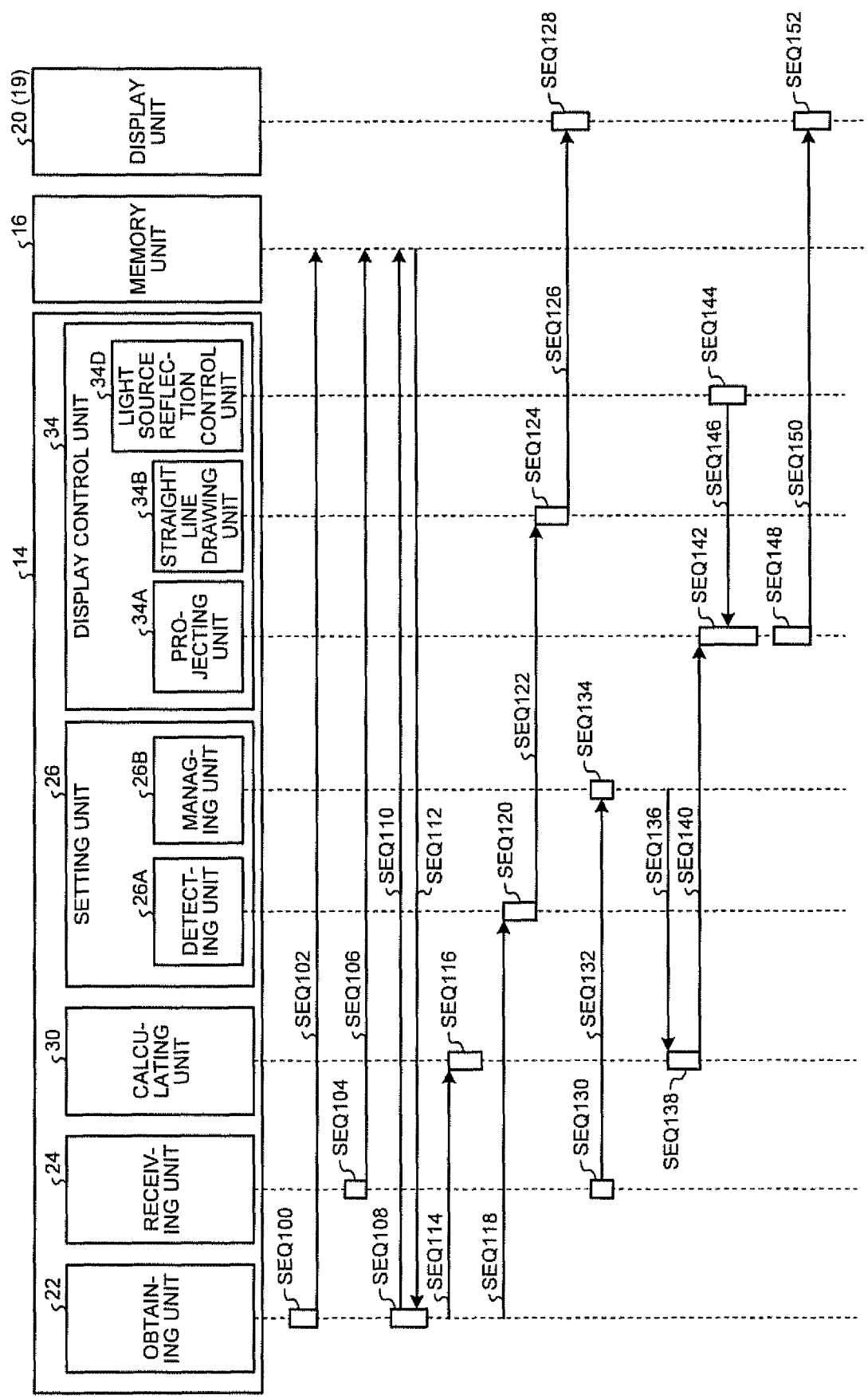

IMAGE PROCESSING DEVICE, IMAGE PROCESSING METHOD, AND RECORDING MEDIUM

CROSS-REFERENCE TO RELATED APPLICATIONS

The present application claims priority under 35 U.S.C. § 119 to Japanese Patent Application No. 2015-184216, filed Sep. 17, 2015. The contents of which are incorporated herein by reference in their entirety.

BACKGROUND OF THE INVENTION

1. Field of the Invention

The present invention relates to an image processing device, an image processing method, and a recording medium.

2. Description of the Related Art

The augmented reality (AR) technology is known in which information created by a computer is displayed in a superimposed manner on the information received from the reality environment. For example, in Japanese Unexamined Patent Application Publication No. 2003-248843, it is disclosed that an object placed in a virtual three-dimensional space is displayed on a two-dimensional display and, in response to a user input, the object placement is done in the two-dimensional display. More particularly, in Japan Patent Application Laid-open No. 2003-248843, it is disclosed that auxiliary lines of XYZ axes are displayed on a monitor and editing is done by deciphering the combinations of machine signals, which represent the input by a user, and the auxiliary lines.

However, in the conventional technology, it is a difficult task to easily place the original image of the target object for placement in a manner in accordance with the sense of perspective indicated in the background image.

SUMMARY OF THE INVENTION

According to one aspect of the present invention, an image processing device includes an obtaining unit, a setting unit, a calculating unit, and a display control unit. The obtaining unit is configured to obtain a background image and an original image. The setting unit is configured to set, as reference straight lines, four straight lines which express sense of perspective in the background image and which pass through four sides constituting a rectangular area in the background image, from among a plurality of straight lines included in the background image. The calculating unit is configured to calculate a virtual area in a virtual three-dimensional space, the virtual area corresponding to a rectangular display area which has the four reference lines as four sides in the background image. The display control unit is configured to display a superimposition image in which the background image and a two-dimensional original image are superimposed, on a display unit, the two-dimensional original image being formed by projecting a three-dimensional original image which is formed by placing the original image in the virtual area, onto a two-dimensional space visually confirmed from a predetermined viewpoint position.

BRIEF DESCRIPTION OF THE DRAWINGS

FIG. 3 is a diagram illustrating an exemplary data structure of a light source information table;

FIG. 15 is a sequence diagram illustrating an exemplary sequence of operations performed for displaying a superimposition image;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
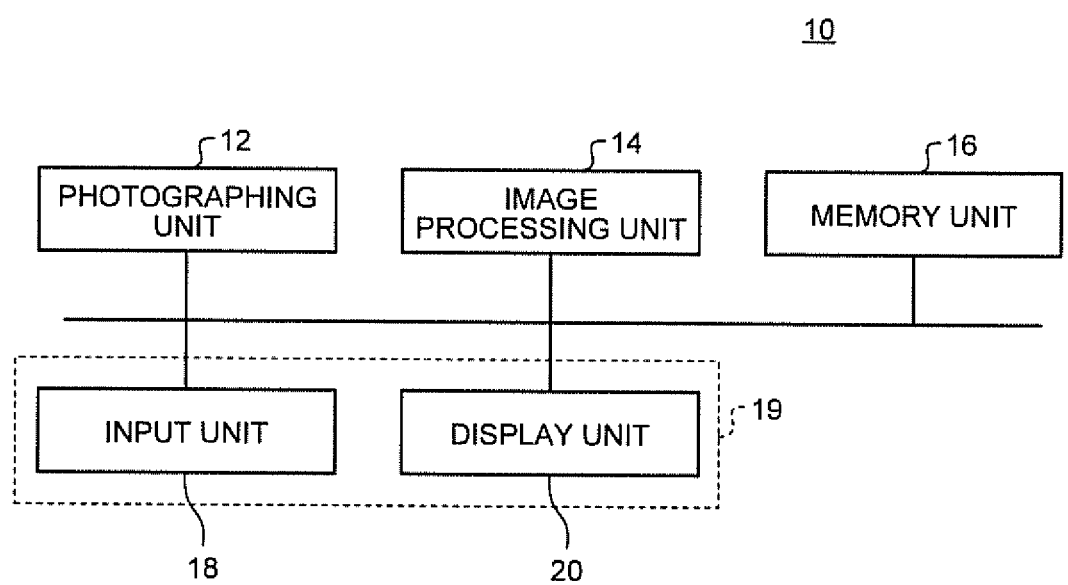
FIG. 1 is an exemplary schematic diagram of an image processing device according to an embodiment.

The terminology used herein is for the purpose of describing particular embodiments only and is not intended to be limiting of the present invention.

As used herein, the singular forms "a", an and the are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An exemplary embodiment of an image processing device, an image processing method, and a recording medium is described below in detail with reference to the accompanying drawings.

FIG. 1 is an exemplary schematic diagram of an image processing device 10 according to the present embodiment.

The image processing device 10 includes a photographing unit 12, an image processing unit 14, a memory unit 16, an input unit 18, and a display unit 20. Herein, the photographing unit 12, the image processing unit 14, the memory unit 16, the input unit 18, and the display unit 20 are electrically connected to each other by a bus.

Herein, it is enough that the image processing device 10 includes at least a single image processing unit 14. Thus, at least one of the photographing unit 12, the memory unit 16, the input unit 18, and the display unit 20 may be installed as a separate unit.

Meanwhile, the image processing device 10 either can be a portable handheld terminal or can be a fixed terminal. In the present embodiment, the explanation is given for an example in which the image processing device 10 is a portable terminal that includes the photographing unit 12, the image processing unit 14, the memory unit 16, the input unit 18, and the display unit 20 in an integrated manner.

The photographing unit 12 photographs an observation environment in the real space. The observation environment represents the environment in which the user visually confirms (observes) the images displayed on the display unit 20. Alternatively, the observation environment can represent the environment for observing a recording medium having an original image printed thereon. The photographing unit 12 photographs and obtains a background image as the photographed image of the observation environment in the real space. The background image either can be a still image or a dynamic picture image.

In the present embodiment, the explanation is given for a case in which, when the supply of electrical power is started to all constituent elements of the image processing device 10, the photographing unit 12 successively photographs background images and sequentially outputs the background images to the image processing unit 14. Examples of the observation environment in the real space include an office, an exhibition space, a railway station, a railway platform, and the inside of various buildings. The photographing unit 12 is a known type of photographic device that takes photographs to obtain photographed images. Meanwhile, a background image can be an image drawn using computer graphics (CG), and is not limited to an image obtained by the photographing unit 12.

The display unit 20 displays a variety of images. Herein, the display unit 20 is a known type of display device such as a liquid crystal display (LCD). In the present embodiment, the display unit 20 is used to store superimposition images (described later).

Moreover, in the present embodiment, the explanation is given for an example in which, in the housing (not illustrated) of the image processing device 10, the display unit 20 and the photographing unit 12 are positioned in such a way that the screen of the display unit 20 and the photographing direction of the photographing unit 12 are in mutually opposite directions. Hence, for example, while keeping the position of the image processing device 10 fixed, if a photographed image that is photographed by the photographing unit 12 is displayed on the display unit 20, then the photographed image displayed on the display unit 20 becomes same as the scenery of the real space positioned on the background of the display unit 20 (i.e., positioned on the opposite side of the screen of the display unit 20).

The input unit 18 receives various operations from the user.

Meanwhile, the input unit 18 and the display unit 20 can be integrated to configure a user interface (UI) unit 19. The UI unit 19 is, for example, a known type of touch-sensitive panel.

In the present embodiment, the explanation is given for an example in which the UI unit 19 is a touch-sensitive panel in which the input unit 18 and the display unit 20 are integrated.

The memory unit 16 is a memory medium such as a memory or a hard disk drive (HDD) that is used to store various computer programs meant for performing various operations (described later) and to store a variety of data.

The image processing unit 14 is a computer configured with a central processing unit (CPU), a read only memory (ROM), and a random access memory (RAM). However, the image processing unit 14 can alternatively be a general-purpose circuit other than a CPU. Herein, the image processing unit 14 controls the constituent elements of the image processing device 10.

The image processing unit 14 performs control to display superimposition images on the display unit 20. In the present embodiment, a superimposition image is an image in which a two-dimensional original image (described later) that corresponds to the original image is superimposed on a background image. Such a display operation is performed by implementing a 3D engine such as OpenGL (which stands for Open Graphics Library).

In the present embodiment, the explanation is given for an example in which a superimposition image is formed when a background image is placed in a virtual three-dimensional space and then a three-dimensional model, which is formed by placing an original image on the background image, is projected onto a two-dimensional surface (a two-dimensional space). Thus, a superimposition image is formed when a two-dimensional original image corresponding to the original image is superimposed on the background image.

Meanwhile, in a superimposition image, it is enough that at least a two-dimensional original image is placed on a background image, and the superimposition image may include other images too.

Examples of other images include a transparent image formed using transparent color materials and a surface effect image in which a surface effect that is to be exerted on a paper sheet using color materials of particular colors (golden, white, transparent, etc.) is defined, which are however are not the only possible examples.

The virtual three-dimensional space represents a three-dimensional space that is virtual in nature. The two-dimensional space represents the display surface of the display unit 20. That is, the two-dimensional space can be expressed using two-dimensional coordinates along the display surface of the display unit 20. The two-dimensional coordinates represent the coordinates on the display surface of the display unit 20. Meanwhile, the virtual three-dimensional space can be expressed using three-dimensional coordinates.

Figure 2:
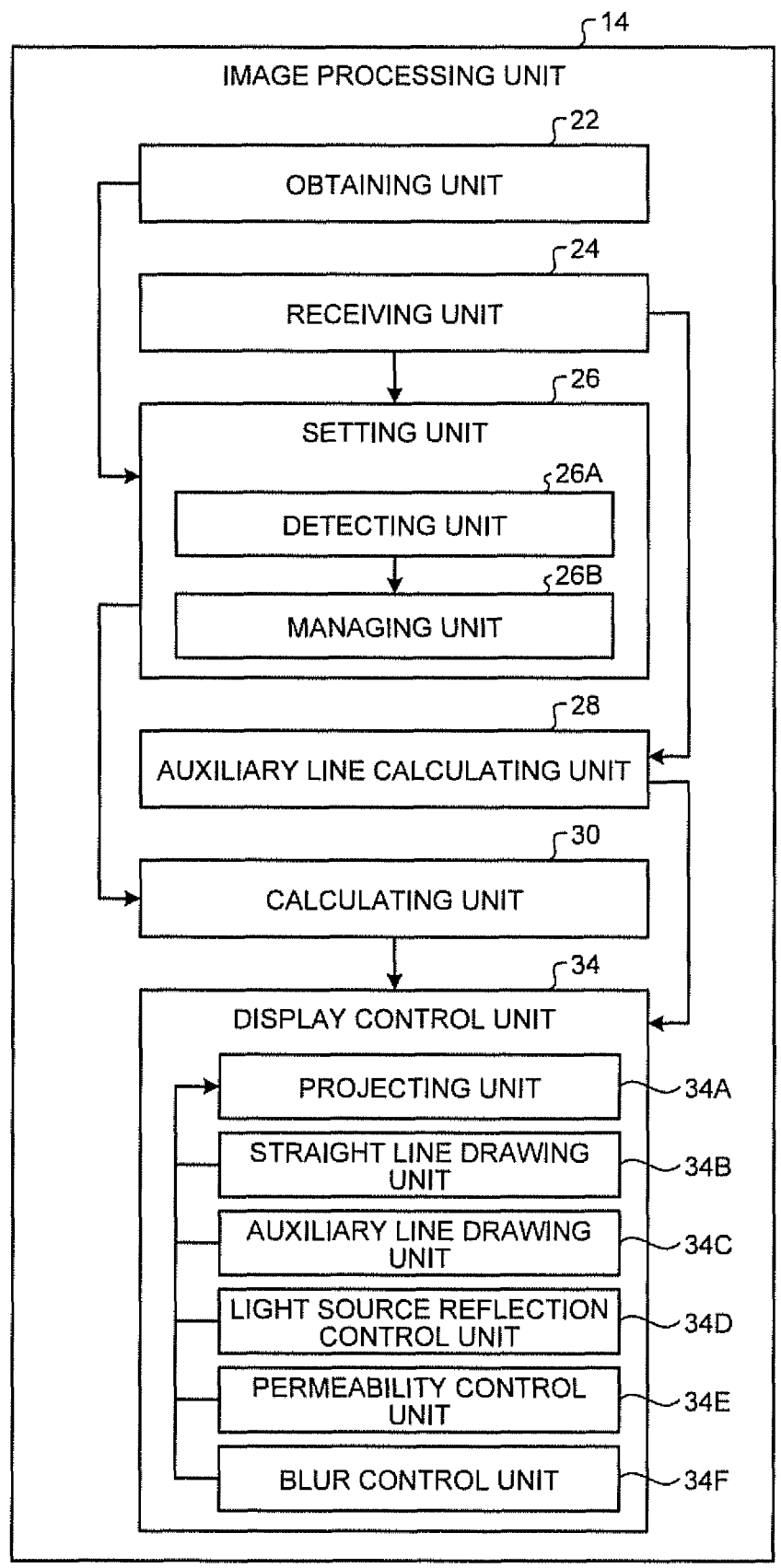
FIG. 2 is a block diagram illustrating a functional configuration of an image processing unit.

FIG. 2 is a block diagram illustrating a functional configuration of the image processing unit 14. Herein, the image processing unit 14 includes an obtaining unit 22, a receiving unit 24, a setting unit 26, an auxiliary line calculating unit 28, a calculating unit 30, and a display control unit 34.

For example, some or all of the obtaining unit 22, the receiving unit 24, the setting unit 26, the auxiliary line calculating unit 28, the calculating unit 30, and the display control unit 34 can be implemented by making a processor such as a CPU to execute computer programs, that is, can be implemented using software; or can be implemented using hardware such as an integrated circuit (IC); or can be implemented using a combination of software and hardware.

The obtaining unit 22 obtains an original image and a background image. The original image represents the target image for placement on the background image. For example, the obtaining unit 22 reads the original image from the memory unit 16 to obtains the original image.

For example, the display control unit 34 displays a list of images stored in the memory unit 16 on the display unit 20. The user operates the input unit 18 and selects the target image for placement. The obtaining unit 22 reads the selected image as the original image, and thus obtains the original image.

Alternatively, the obtaining unit 22 can obtain, as the original image, an image photographed by the photographing unit 12. Still alternatively, the obtaining unit 22 can obtain, as the original image, an image read by a known type of scanner device (not illustrated). In that case, the image processing unit 14 can be electrically connected to the scanner device.

Meanwhile, in the present embodiment, the obtaining unit 22 obtains, as the background image, a photographed image of the observation environment in the real space as photographed by the photographing unit 12.

The receiving unit 24 receives operation instructions issued by the user with respect to the input unit 18 (the UI unit 19).

In the present embodiment, the receiving unit 24 receives light source information, movement start information (described later in detail), and movement end information (described later in detail) from the input unit 18.

The light source information represents information indicating the reflectance property of a virtual light source placed in the virtual three-dimensional space. Thus, the virtual light source represents a light source that is virtually placed in the virtual three-dimensional space. For example, the receiving unit 24 is used to store, in advance, a light source information table. Then, in response to an operation instruction issued by the user with respect to the input unit 18, the receiving unit 24 receives light source information selected from the light source information table.

FIG. 3 is a diagram illustrating an exemplary data structure of the light source information table. In the light source information table, the following information is held in a corresponding manner: light source IDs enabling identification of the types of light sources; light source names; and light source information. The light source information table can be in the form of a database, and there is no restriction on the data format.

The light source information represents information indicating the light attributes of the light source identified by the corresponding light source ID. The light attributes represent information enabling identification of the amount of reflection for the purpose of creating light at the time of displaying a superimposition image. The light source information is expressed using the light intensity (luminance) of the RGB color components in mirror surface light; diffusion light; and environmental light. Each of the RGB color components has the maximum light value of "1.0" and the minimum light value of "0".

More particularly, in FIG. 3, "(1.00, 0.95, 0.95) written as an exemplary value of the mirror surface light indicates that the light intensity of the mirror surface light is 1.00, 0.95, and 0.95 for the R color component, the G color component, and the B color component, respectively.

The amount of light required for creating light at the time of displaying a superimposition image is decided according to the result of multiplication of the light intensity of the light source (the light source information) and the reflectance of an object. Herein, the reflectance of objects can be stored in advance in the memory unit 16. Meanwhile, regarding the amount of reflection, the coordinate positions of the light source in the virtual three-dimensional space can be added to the light source information, and OpenGL can be used to calculate the amount of reflection.

The display control unit 34 reads the light source information table stored in the memory unit 16 and displays, in a selectable manner on the display unit 20, a list of the sets of light source information registered in the light source information table. The user operates the input unit 18 and inputs the light source information corresponding to the desired light source name from among the displayed list of the sets of light source information. Consequently, the receiving unit 24 receives the light source information.

Meanwhile, in response to a user operation of the input unit 18, new light source information can be registered in an original information table or new original reflection information can be registered in an original reflection information table, or the registered information can be made editable.

Returning to the explanation with reference to FIG. 2, the setting unit 26 sets, as reference straight lines, four straight lines from among a plurality of straight lines included in the background image. The four straight lines set by the setting unit 26 express the sense of perspective in the background image, and pass through the four sides constituting a rectangular area in the background image. Meanwhile, the setting unit 26 includes a detecting unit 26A and a managing unit 26B.

The detecting unit 26A detects a plurality of straight lines included in the background image. The managing unit 26B sets four reference straight lines from among a plurality of straight lines detected by the detecting unit 26A.

Figure 4A:
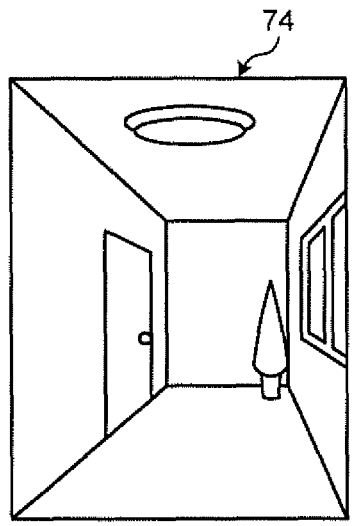
FIGS. 4A to 4C are explanatory diagrams for explaining an example of setting reference straight lines.
Figure 4B:
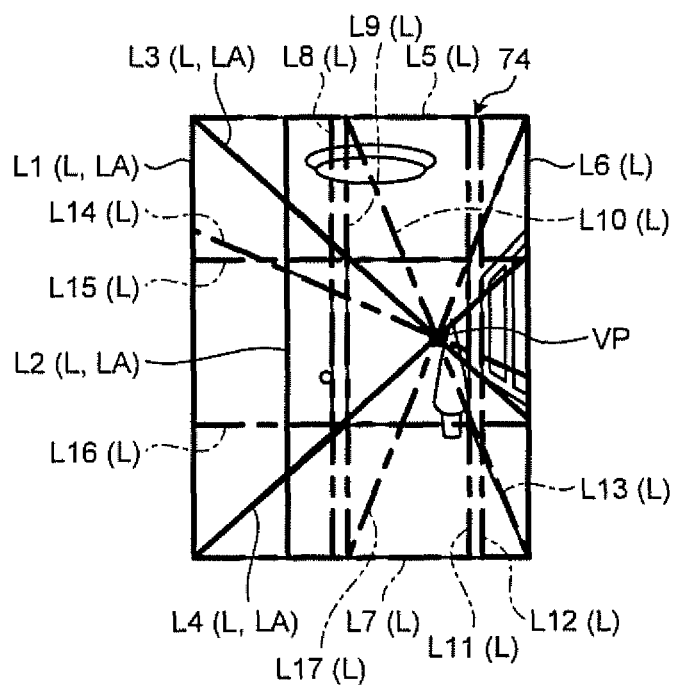
Figure 4C:
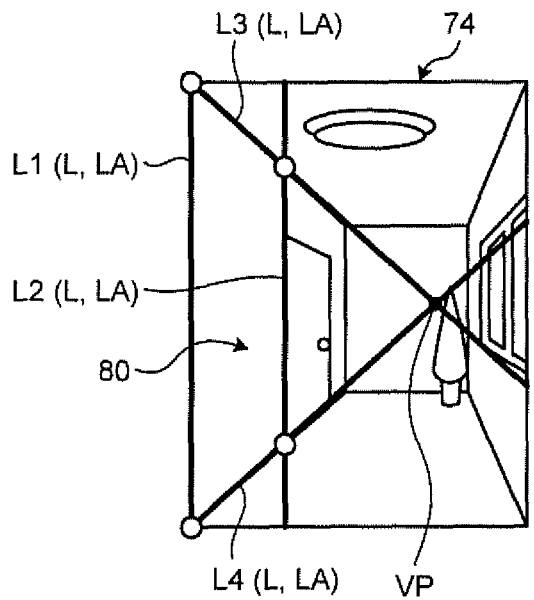

FIGS. 4A to 4C are an explanatory diagram for explaining an example of setting reference straight lines LA. For example, assume that the obtaining unit obtains a background image 74 illustrated in FIG. 4A. In that case, the detecting unit 26A detects a plurality of straight lines included in the background image 74. Herein, the detecting unit 26A implements a known image processing technology for detecting straight lines included in an image, and detects a plurality of straight lines included in the background image 74. For example, the detecting unit 26A can detect the straight lines by implementing a known feature point detecting technology such as Hough transform or by utilizing an image processing engine such as OpenCV. Meanwhile, it is assumed that the straight lines detected by the detecting unit 26A also include the four straight lines constituting the outer frame of the background image 74.

For example, the detecting unit 26A detects a straight line L1 to a straight line L17 as a plurality of straight lines included in the background image 74 (see FIG. 4B). Herein, as straight lines L included in the background image 74, the detecting unit 26A detects the four straight lines constituting the outer frame of the background image 74 (i.e., in FIG. 4B, the straight lines L1, L5, L6, and L7). Moreover, as the straight lines L included in the background image 74, the detecting unit 26A detects the straight lines that are formed when straight lines which are included in the background image 74 but which do not constitute the outer frame are extended up to the positions intersecting the outer frame of the background image 74.

Hence, for example, the detecting unit 26A detects the straight lines L (the straight lines L1 to the straight lines L17) illustrated in FIG. 4B as a plurality of straight lines L included in the background image 74.

The managing unit 26B sets, as the reference straight lines LA, four straight lines L which express the sense of perspective in the background image 74 and which pass through the four sides constituting a rectangular area in the background image 74, from among a plurality of straight lines L (the straight lines L1 to L17).

Herein, the rectangle area represents a quadrangular area having four sides and four vertices.

For example, the managing unit 26B outputs, to the display control unit 34, information indicating a plurality of straight lines (the straight lines L1 to L17) detected by the detecting unit 26A. Then, the display control unit 34 draws the straight lines (the straight lines L1 to L17) detected by the detecting unit 26A, and displays the straight lines on the UI unit 19. Thus, on the UI unit 19 is displayed the background image 74 in which the straight lines L (the straight lines L1 to L17) are drawn as illustrated in FIG. 4B.

The user operates the UI unit 19 while referring to the displayed straight lines L (the straight lines L1 to L17), and selects four straight lines L which express the sense of perspective in the background image 74 and which pass through the four sides constituting a rectangular area in the background image 74. At that time, it is desirable that the display control unit 34 displays a message prompting selection of four straight lines that express the sense of perspective and that constitute a rectangular area, on the display unit 20.

For example, assume that the user selects the straight lines L1, L2, L3, and L4 from among a plurality of straight lines L (the straight lines L1 to L17) drawn on the background image 74. In that case, the UI unit 19 outputs, to the image processing unit 14, information indicating the selected straight lines L (the straight lines L1 to L4). As a result, the managing unit 26B receives, via the receiving unit 24, information indicating the four straight lines L (the straight lines L1 to L4) that express the sense of perspective in the background image 74 and that constitute a rectangular area in the background image 74. Then, the managing unit 26B sets the four straight lines L (the straight lines L1 to L4), which are specified in the received information, as the reference straight lines LA (see FIG. 4C).

Meanwhile, it is desirable that the managing unit 26B determines whether or not the straight lines L selected in response to a user operation of the UI unit 19 represents the straight lines L expressing the sense of perspective in the background image 74. Then, it is desirable that, until the straight lines L expressing the sense of perspective are selected, the display control unit 34 displays a message prompting reselection of the straight lines L on the UI unit 19. As a result, even if the straight lines are not clear, it becomes possible to set the reference straight lines LA.

Meanwhile, alternatively, the managing unit 26B can set the reference straight lines LA by detecting four straight lines L from a plurality of straight lines L (the straight lines L1 to L17) detected by the detecting unit 26A.

In that case, for example, the managing unit 26B implements a known image processing method and detects a vanishing point VP in the background image 74. Then, the managing unit 26B selects, from among a plurality of straight lines L (the straight lines L1 to L17) detected by the detecting unit 26A, a plurality of straight lines passing through the vanishing point VP. For example, the managing unit 26B selects the straight lines L10, L3, L14, L4, L17, and L13.

Moreover, from among a plurality of straight lines L (the straight lines L1 to L17) detected by the detecting unit 26A, the managing unit 26B selects a plurality of straight lines L that, with respect to the straight lines L1 passing through the vanishing point VP, intersect at positions other than the vanishing point VP. For example, the managing unit 26B selects the straight lines L1, L2, L5, L7, L8, L9, L11, L12, and L6.

Subsequently, the managing unit 26B sequentially selects a different combination of two arbitrary straight lines L from among the straight lines passing through the vanishing point VP and two arbitrary straight lines L that intersect with the earlier-mentioned two straight lines L at positions other than the vanishing point VP. Then, for each selected combination, the managing unit 26B extracts, from the background image 74, a rectangular area formed by the four straight lines L belonging to the concerned combination (i.e., the two straight lines L passing through the vanishing point VP and the two straight lines L that intersect with the earlier-mentioned two straight lines L at positions other than the vanishing point VP).

For example, a rectangular area formed by the straight lines L1, L2, L3, and L4 and a rectangular area formed by the straight lines L2, L8, L3, and L4 are extracted from the background image 74.

The display control unit 34 displays each rectangular area, which is extracted by the managing unit 26B, on the display unit 20. When one of the rectangular areas is selected in response to a user operation of the UI unit 19, the managing unit 26B can set, as the reference straight lines LA, the straight lines L (for example, the straight lines L1, L2, L3, and L4) passing through the four sides constituting the selected rectangular area (see FIG. 4C). The following explanation is given for an example in which the setting unit 26 sets the straight lines L1, L2, L3, and L4 as the reference straight lines LA.

Then, the managing unit 26B stores, in the memory unit 16, information indicating the four reference straight lines LA that have been set (hereinafter, sometimes referred to as reference straight line information). More specifically, the managing unit 26B stores, as the reference straight line information in the memory unit 16, the two-dimensional coordinates of the four reference straight lines LA that have been set.

In the present embodiment, the explanation is given for a case in which the reference straight line information of each of the four reference straight lines LA is expressed using the two-dimensional coordinates of both ends in the long length direction of the concerned reference straight line LA.

Returning to the explanation with reference to FIG. 2, the calculating unit 30 calculates such a virtual area in the virtual three-dimensional space which corresponds to the rectangular display area having the four reference straight lines LA, which are set by the setting unit 26, as the four sides.

More particularly, the calculating unit 30 calculates such a virtual area in the virtual three-dimensional space which corresponds to a rectangular display area 80 having the four reference straight lines LA illustrated in FIG. 4C (i.e., having the straight lines L1, L2, L3, and L4) as the four sides.

Figure 5A:
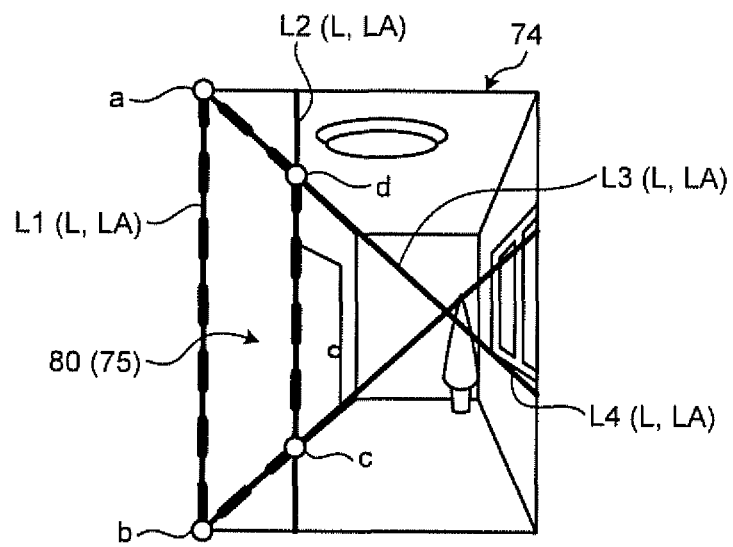
FIGS. 5A and 5B are explanatory diagrams for explaining an example of calculating a display area.
Figure 5B:
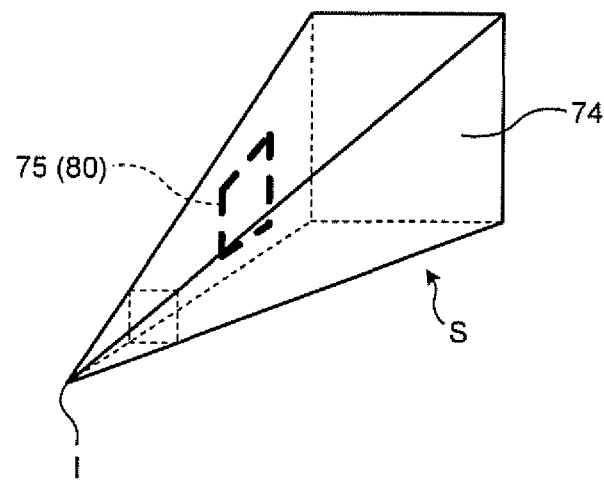

FIGS. 5A and 5B are an explanatory diagram for explaining an example of calculating the display area 80. For example, as illustrated in FIG. 5A, the display area 80 gets set in the background image 74 by the four reference straight lines LA set by the setting unit 26 (i.e., by the straight lines L1, L2, L3, and L4).

The display area 80 is a rectangular area having the four reference straight lines LA (the straight lines L1 to L4) as the four sides and having four vertices a, b, c, and d formed due to the intersection of the reference straight lines LA.

Firstly, the calculating unit 30 identifies the two-dimensional coordinates of each of the four vertices (the vertices a, b, c, and d) of the display area 80, and accordingly identifies the display area 80.

Then, as illustrated in FIG. 5B, the calculating unit 30 places the display area 80, which is present in the two-dimensional space, in a virtual three-dimensional space S. Herein, the virtual three-dimensional space S is a virtual space in which the background image 74 is visually confirmed from a predetermined viewpoint position I. Accordingly, the calculating unit 30 calculates the three-dimensional coordinates when the display area 80 that is represented by two-dimensional coordinates is placed in the virtual three-dimensional space S. As a result of calculating the three-dimensional coordinates, the position and the inclination of the display area 80 in the virtual three-dimensional space get calculated.

Herein, the display area 80 that is placed in the virtual three-dimensional space S is referred to as a virtual area 75. Thus, the calculating unit 30 calculates such three-dimensional coordinates in the virtual three-dimensional space which correspond to the display area 80 represented by two-dimensional coordinates, to calculate the virtual area 75.

The calculating unit 30 calculates the virtual area 75 using an inclination/position matrix. Herein, the inclination/position matrix represents a matrix for calculating the inclination and the position (depth) of the virtual area 75 corresponding to the display area 80 in the virtual three-dimensional space S.

More particularly, the calculating unit 30 calculates the virtual area 75 in the virtual three-dimensional space S using the following: a projection matrix meant for projecting an original surface, which is temporarily placed at a predetermined reference position in the virtual three-dimensional space S, onto the two-dimensional space in the display surface of the display unit 20; using the inclination/position matrix; the two-dimensional coordinates of the display area 80; and the original image.

The original surface that is temporarily placed in the three-dimensional virtual space S represents an image in which, based on the vertical and horizontal lengths of the original image, the four vertices of the original image having the concerned size and shape are temporarily placed in the virtual three-dimensional space S. That is, the original surface represents the original image temporarily placed in the virtual three-dimensional space S. In the present embodiment, the original surface is rectangular in shape.

The reference position in the virtual three-dimensional space S implies the XY plane having Z=0 in the virtual three-dimensional space S. The position at which Z=0 holds true is equivalent to the position of a virtual camera that copies the virtual three-dimensional space S in OpenGL, and the Z-axis direction implies the opposite direction (180° opposite direction) to the photographing direction of the virtual camera.

Then, the calculating unit 30 calculates the inclination/position matrix using the following: the two-dimensional coordinates of the four vertices of the display area 80; the coordinates of the four vertices of the original surface that is temporarily placed in the virtual three-dimensional space S; and the projection matrix meant for projection of the original surface, which is temporarily placed in the virtual three-dimensional space S, onto the two-dimensional space.

Then, the calculating unit 30 applies the three-dimensional coordinates of the four vertices of the original surface, which is temporarily placed in the virtual three-dimensional space S, to the inclination/position matrix; and calculates the three-dimensional coordinates of the four vertices of the virtual area 75 corresponding to the display area 80 in the virtual three-dimensional space S.

As a result, the calculating unit 30 calculates a virtual area 75 corresponding to the specified display area 80 in the virtual three-dimensional space S.

Figure 6:
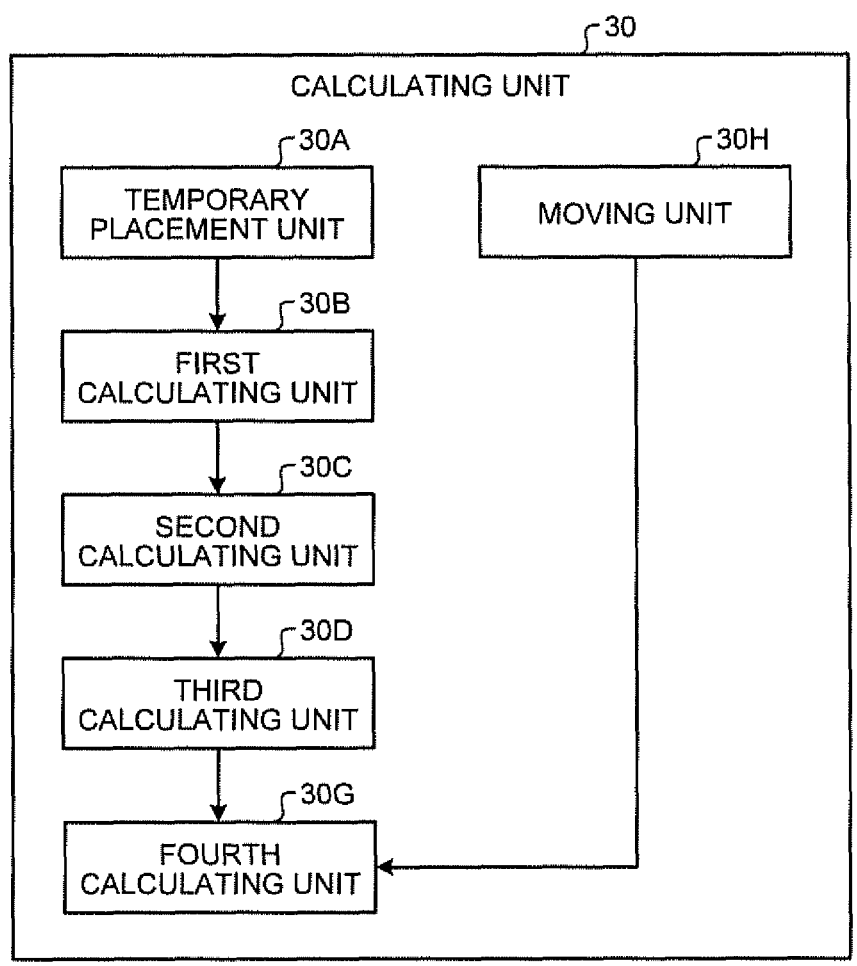
FIG. 6 is a functional block diagram of a calculating unit.

FIG. 6 is a functional block diagram of the calculating unit 30. Herein, the calculating unit 30 includes a temporary placement unit 30A, a first calculating unit 30B, a second calculating unit 30C, a third calculating unit 30D, a fourth calculating unit 30G, and a moving unit 30H.

Some or all of the temporary placement unit 30A, the first calculating unit 30B, the second calculating unit 30C, the third calculating unit 30D, the fourth calculating unit 30G, and the moving unit 30H can be implementing by making a processor such as a CPU to execute computer programs, that is, can be implemented using software; or can be implemented using hardware such as an IC; or can be implemented using a combination of software and hardware.

The temporary placement unit 30A obtains the display area 80 set by the setting unit 26. More specifically, the temporary placement unit 30A obtains the two-dimensional coordinates of each vertex of the display area 80. Moreover, the temporary placement unit 30A obtains the vertical and horizontal sizes of the original image to be displayed.

Then, the temporary placement unit 30A temporarily places the original surface, which has the vertical and horizontal sizes of the original image, on the XY plane having Z=0 in the virtual three-dimensional space S. That is, firstly, the temporary placement unit 30A temporarily places the original surface, which is to be displayed, on the XY plane having Z=0 in the virtual three-dimensional space S, and treats the original surface as the original surface temporarily placed in the virtual three-dimensional space S.

Figures 7, 8:
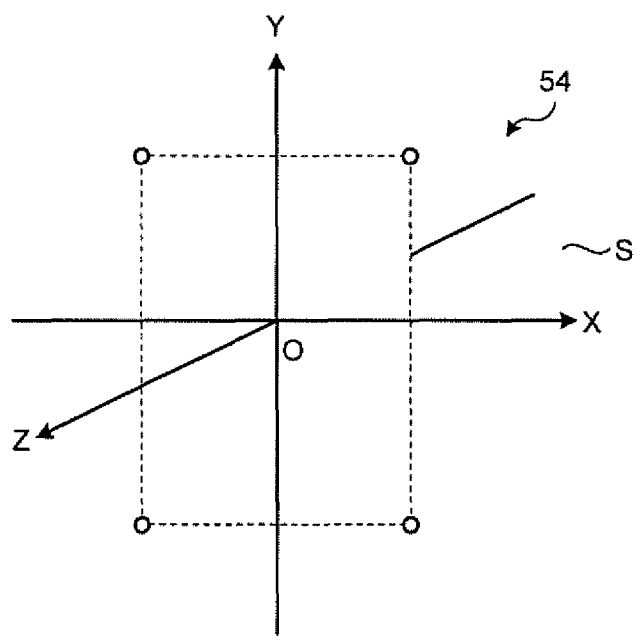
FIG. 7 is an explanatory diagram for explaining an original surface that is temporarily placed in a virtual three-dimensional space.
FIG. 8 is a diagram illustrating an example of initial placement coordinates.

FIG. 7 is an explanatory diagram for explaining an original surface 54 that is temporarily placed in the virtual three-dimensional space S. The temporary placement unit 30A superimposes the center of the original surface 54 on an origin O of the XY plane in the virtual three-dimensional space S and sets the coordinates (three-dimensional coordinates) of the four vertices of the original surface 54 as initial values, to temporary place the original surface 54.

Herein, assume that "width" represents the horizontal width of the original image, "height" represents the height, and Ox=width/2 and Oy=height/2 holds true. In that case, the four vertices of the temporarily-placed original surface 54 have the initial placement coordinates in the virtual three-dimensional space S equal to the values illustrated in FIG. 8. Herein, FIG. 8 is a diagram illustrating an example of the initial placement coordinates.

For example, each of the four vertices of the temporarily-placed original surface (i.e., each of the top left vertex, the top right vertex, the bottom left vertex, and the bottom right vertex) has the initial placement coordinates as illustrated in FIG. 8.

Then, the temporary placement unit 30A holds the initial placement coordinates of the temporarily-placed original surface 54.

Returning to the explanation with reference to FIG. 6, the first calculating unit 30B calculates a projection matrix F.

Figure 9:
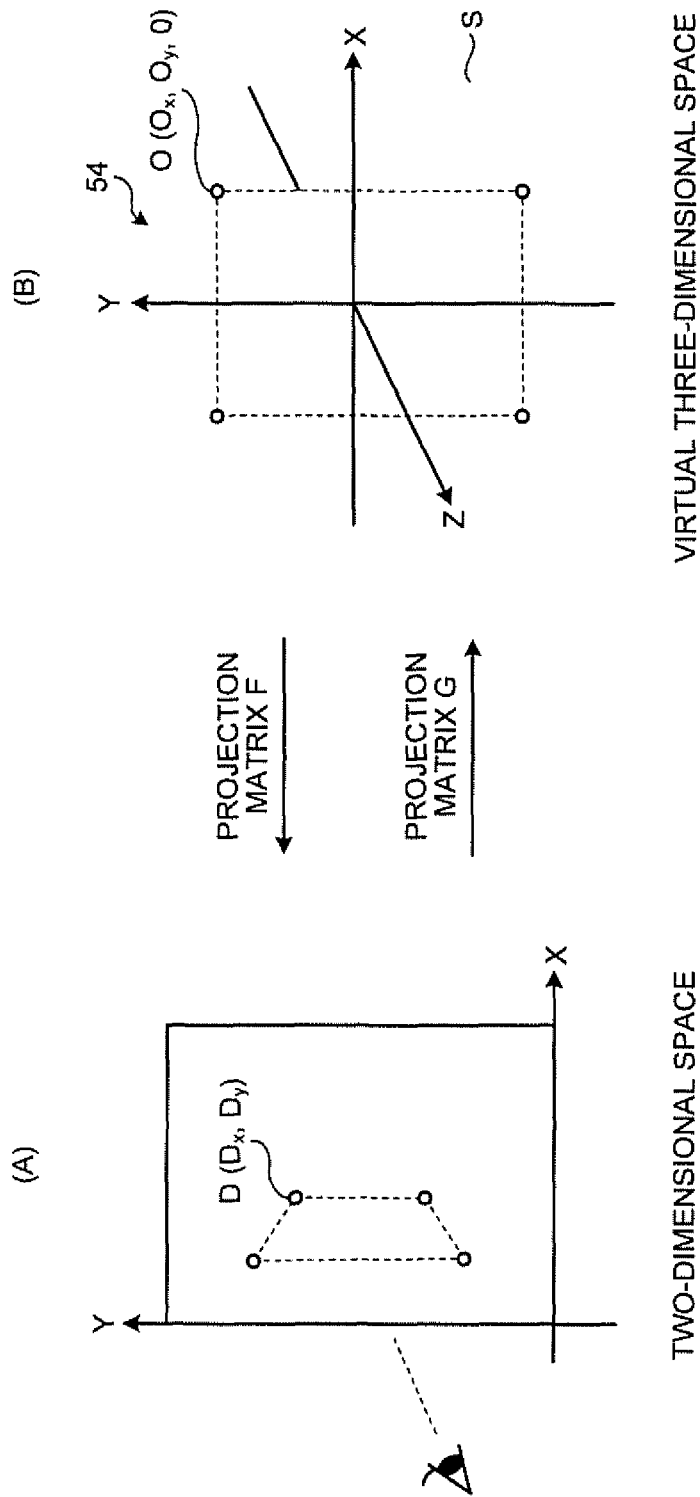
FIG. 9 is an explanatory diagram for explaining the calculation of projection matrices.

FIG. 9 is an explanatory diagram for explaining the calculation of projection matrices F and G. The projection matrix F is used for projecting the initial placement coordinates of the original surface 54, which is temporarily placed in the virtual three-dimensional space (see FIG. 9(B)), onto two-dimensional coordinates in the two-dimensional space (FIG. 9(A)).

That is, the first calculating unit 30B calculates the projection matrix F that is to be used for projecting initial placement coordinates (Ox, Oy, Oz) of the top right vertex O of the original surface 54, which is temporarily placed in the virtual three-dimensional space, onto two-dimensional coordinates (Dx, Dy) of an vertex D in the two-dimensional space.

Moreover, the first calculating unit 30B calculates the projection matrix G that is for the reverse projection of the abovementioned projection. That is, the first calculating unit 30B calculates the projection matrix G for projecting two-dimensional coordinates in the two-dimensional space onto the initial placement coordinates of the original surface 54, which is temporarily placed in the virtual three-dimensional space S.

Meanwhile, as described above, in the present embodiment, a display operation is performed in which OpenGL is used. Hence, in the present embodiment, the first calculating unit 30B calculates the projection matrices F and G according to the OpenGL-based conversion stage.

Figure 10:
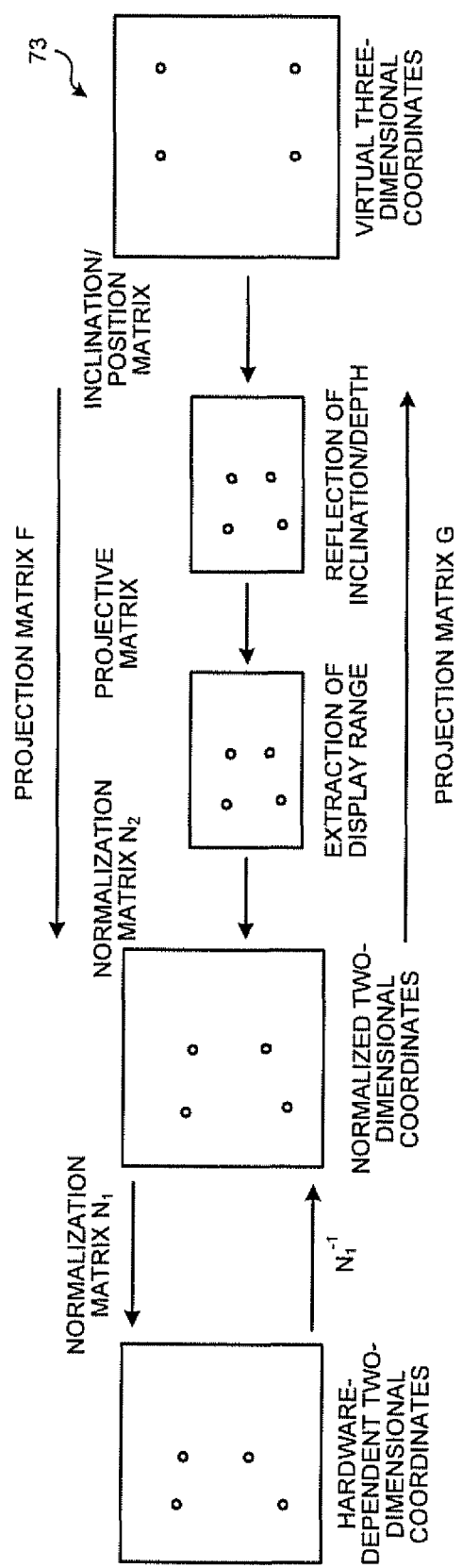
FIG. 10 is an explanatory diagram for explaining the relationship between a conversion stage and a projection matrix.

FIG. 10 is an explanatory diagram for explaining the relationship between the OpenGL-based conversion stage and a projection matrix. The first calculating unit 30B follows the conversion stage of OpenGL and converts the two-dimensional coordinates in the two-dimensional space (in FIG. 10, refer to hardware-dependent two-dimensional coordinates) into normalized two-dimensional coordinates using an inverse matrix $N_1^{-1}$ of a normalization matrix $N_1$, and then calculates the projection matrices F and G. Herein, the first calculating unit 30B can calculate the projection matrices F and G using a known calculating formula for projection matrix calculation or using an arbitrary equivalent calculating formula. Alternatively, the first calculating unit 30B can calculate the projection matrices F and G using a computer vision library such as OpenCV (which stands for Open Source Computer Vision Library).

The projection matrices F and G calculated by the first calculating unit 30B are given below.

$$F \cong \begin{pmatrix} f_{11} & f_{12} & f_{13} & f_{14} \\ f_{21} & f_{22} & f_{23} & f_{24} \\ f_{31} & f_{32} & f_{33} & f_{34} \end{pmatrix} = (f_1 \; f_2 \; f_3 \; f_4) \quad (1)$$

$$G \cong \begin{pmatrix} g_{11} & g_{12} & g_{13} & g_{14} \\ g_{21} & g_{22} & g_{23} & g_{24} \\ g_{31} & g_{32} & g_{33} & g_{34} \end{pmatrix} \quad (2)$$

Equation (1) represents the projection matrix F, while Equation (2) represents the projection matrix G. By definition, a projection matrix has indefiniteness of a constant factor. Hence, even if a projection matrix is multiplied by an arbitrary scale factor (a non-zero value), the same conversion is obtained. Meanwhile, in the projection matrix F, 3-row, 1-column vectors are expressed as f1, f2, f3, and f4 starting from the left side.

The second calculating unit 30C calculates the inclination/position matrix. As described above, the inclination/position matrix is for calculating the inclination and the position (depth) of the virtual area 75 corresponding to the display area 80 in the virtual three-dimensional space S.

The second calculating unit 30C obtains the projection matrix F from the first calculating unit 30B. Moreover, the second calculating unit 30C obtains the optical property parameters of the photographing unit 12. The optical property parameters of the photographing unit 12 include the focal length of the photographing unit 12 as well as parameters such as the width and height of a single pixel, the image center, and the focal length in units of pixels (the distance from the lens center to the image plane) in a charge-coupled device (CCD) image sensor. The memory unit 16 is used to store in advance the optical property parameters of the photographing unit 12. Thus, the second calculating unit 30C can read the optical property parameters from the memory unit 16.

The second calculating unit 30C calculates the inclination/position matrix using the projection matrix F and the optical property parameters of the photographing unit 12. In the present embodiment, the second calculating unit 30C calculates the inclination/position matrix using the projection matrix F and a projective matrix A (described later).

Firstly, the second calculating unit 30C calculates, from the optical property parameters of the photographing unit 12, a projective matrix (hereinafter, referred to as the projective matrix A) that is for projecting a three-dimensional image placed in the virtual three-dimensional space S onto a two-dimensional image (that is, projecting three-dimensional coordinates in the virtual three-dimensional space onto two-dimensional coordinates in the two-dimensional space). The projective matrix A is given below in Equation (3).

$$A = \begin{pmatrix} a_x & 0 & c_x \\ 0 & a_y & c_y \\ 0 & 0 & 1 \end{pmatrix} \quad (3)$$

In Equation (3), $a_x$ and $a_y$ represent the focal lengths of the photographing unit 12. More specifically, ax and ay represent the distance from the lens center of the photographing unit 12 to the plane in which a photographing element array (CCD: Charge-Coupled device) is placed. Moreover, $c_x$ and $c_y$ represent principal points and, in the present embodiment, represent the image center. Herein, the image center indicates the center of a two-dimensional that is photographed.

It is desirable that the second calculating unit 30C calculates the projective matrix A using the optical property parameters of the photographing unit 12 at the time of obtaining the background image 74 to be displayed. As a result of using the projective matrix A that is calculated from the optical property parameters of the photographing unit 12, it becomes possible to have a two-dimensional original image included in a preview image and having the same optical conditions as the photographing conditions of the background image 74. That is, it becomes possible to achieve two-dimensional properties identical to the objects appearing in the background image.

In the present embodiment, the second calculating unit 30C calculates in advance the projective matrix A from the optical property parameters of the photographing unit 12 installed in the image processing device 10, and stores in advance the projective matrix A in the memory unit 16. Alternatively, the second calculating unit 30C can store, in advance in the memory unit 16, a plurality of projective matrices A each of which is calculated from the optical property parameters of one of a plurality of photographing units 12 that photographs the background image 74. Then, in the image processing unit 14, the projective matrices A can be displayed on the display unit 20 in a user-selectable manner, and the second calculating unit 30C can use the projective matrix A that is selected by the user by operating the input unit 18. Still alternatively, the user can be allowed to arbitrarily set the optical property parameters and the projective matrix A by operating the input unit 18.

Subsequently, the second calculating unit 30C calculates the inclination/position matrix using the projection matrix F and the projective matrix A. For example, the second calculating unit 30C calculates the inclination/position matrix from the projection matrix F and the projective matrix A using the homography analysis method. When the homography analysis method is implemented, there are times when the values are not constant and when a complex root is obtained. Meanwhile, the inclination/position matrix is given below in Equation (4).

$$\begin{pmatrix} r_{11} & r_{12} & r_{13} & t_x \\ r_{21} & r_{22} & r_{23} & t_y \\ r_{31} & r_{32} & r_{33} & t_z \end{pmatrix} = [r_1 \ r_2 \ r_3 \ t] \quad (4)$$

In Equation (4), 3-row, 1-column vectors of the inclination/position matrix are expressed as γ1, γ2, γ3, and t starting from the left side. Moreover, γ3 represents the cross product of γ1 and γ2.

The second calculating unit 30C calculates the inclination/position matrix using Equation (5) given below.

$$[r_1 \ r_2 \ r_3 \ t] = \left[ \frac{A^{-1}f_1}{\mu_1} \ \frac{A^{-1}f_2}{\mu_2} \ r_1 \times r_2 \ \frac{A^{-1}f_4}{\mu_1} \right] \quad (5)$$

$$\mu_1 = \|A^{-1}f_1\| \quad (6)$$

$$\mu_2 = \|A^{-1}f_2\| \quad (7)$$

Herein, $\mu_1$ in Equation (5) can be expressed using Equation (6), while $\mu_2$ in Equation (5) can be expressed using Equation (7).

In the present embodiment, the second calculating unit 30C makes use of OpenGL. Hence, the second calculating unit 30C adds a row vector (0, 0, 0, 1) to the inclination/position matrix given in Equation (4) to convert the inclination/position matrix into a 4×4 matrix and calculates the resultant matrix as the inclination/position matrix (see Equation (8) given below).

$$\frac{\text{Inclination}}{\text{position matrix}} = \begin{pmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{pmatrix} \quad (8)$$

The second calculating unit 30C holds the calculated inclination/position matrix (see Equation (8) given above).

Then, to the third calculating unit 30D, the second calculating unit 30C outputs the calculated inclination/position matrix, the projection matrix, and the optical property parameters used in the calculation.

The third calculating unit 30D calculates a projective matrix B that is for projecting a three-dimensional image placed in the virtual three-dimensional space S onto a two-dimensional image (i.e., projecting three-dimensional coordinates in the virtual three-dimensional space S onto two-dimensional coordinates in the two-dimensional space).

Meanwhile, even if the inclination/position matrix is multiplied with the projective matrix A obtained from the optical property parameters, the result is not identical to the projection matrix F. For that reason, the third calculating unit 30D calculates the projective matrix B in such a way that the result of multiplying the projective matrix B to the inclination/position matrix is identical to the projection matrix F. Herein, M represents a 3×3 correction matrix for making the result of multiplication of the inclination/position matrix and the projective matrix B identical to the projection matrix F. The third calculating unit 30D performs homography analysis; derives Equations (9) and (10) given below; and calculates the correction matrix M according to Equation (14).

$$\lambda[f_1 \ f_2 \ f_4] = A \cdot \left[ \frac{A^{-1}f_1}{\mu_1} \ \frac{A^{-1}f_2}{\mu_1} \ \frac{A^{-1}f_4}{\mu_1} \right] \quad (9)$$

$$\lambda[f_1 \ f_2 \ f_4] = AM \cdot \left[ \frac{A^{-1}f_1}{\mu_1} \ \frac{A^{-1}f_2}{\mu_2} \ \frac{A^{-1}f_4}{\mu_1} \right] \quad (10)$$

$$\mu_1 = \|A^{-1}f_1\| \quad (11)$$

$$\mu_2 = \|A^{-1}f_2\| \quad (12)$$

$$\lambda = \left\| \frac{1}{A^{-1}f_1} \right\| \quad (13)$$

$$M = \left[ \frac{A^{-1}f_1}{\mu_1} \ \frac{A^{-1}f_2}{\mu_1} \ \frac{A^{-1}f_4}{\mu_1} \right] \left[ \frac{A^{-1}f_1}{\mu_1} \ \frac{A^{-1}f_2}{\mu_2} \ \frac{A^{-1}f_4}{\mu_1} \right]^{-1} \quad (14)$$

Herein, $\mu_1$ in Equations (9), (10), and (14) can be expressed using Equation (11), while $\mu_2$ in Equations (9), (10), and (14) can be expressed using Equation (12). Moreover, γ in Equations (9) and (10) can be expressed using Equation (13).

Hence, the projective matrix B can be expressed using Equation (15).

$$B = AM \quad (15)$$

Herein, the third calculating unit 30D modifies the projective matrix A and the correction matrix M, which are given in Equation (15), as given in Equation (16) for use in OpenGL.

$$B = \begin{pmatrix} a_x & 0 & 0 & 0 \\ 0 & a_y & 0 & 0 \\ 0 & 0 & \frac{n+f}{n-f} & \frac{2fn}{f-n} \\ 0 & 0 & -1 & 0 \end{pmatrix} \begin{pmatrix} m_{11} & m_{12} & m_{13} & 0 \\ m_{21} & m_{22} & m_{23} & 0 \\ m_{31} & m_{32} & m_{33} & 0 \\ 0 & 0 & 0 & 1 \end{pmatrix} \quad (16)$$

In Equation (16), n and f decide the projection range in the z-axis direction in OpenGL. More particularly, n represents the shorter clip distance along the negative z-axis direction, while f represents the longer clip distance along the negative z-axis direction.

The third calculating unit 30D notifies the fourth calculating unit 30G and the display control unit 34 about the initial placement coordinates of the four vertices of the temporarily-placed original surface 54, the inclination/position matrix, and the projective matrix B.

The fourth calculating unit 30G applies the three-dimensional coordinates (the initial placement coordinates) of the four vertices of the original surface 54, which is temporarily placed in the virtual three-dimensional space S, to the inclination/position matrix and calculates the three-dimensional coordinates of the four vertices of the virtual area 75 that is present in the virtual three-dimensional space S and that corresponds to the display area 80 in the two-dimensional space. Then, the fourth calculating unit 30G notifies the display control unit 34 about the calculated three-dimensional coordinates of the virtual area 75.

The detailed explanation of the moving unit 30H is given later.

Returning to the explanation with reference to FIG. 2, the display control unit 34 places the original image in the calculated virtual area 75 in the virtual three-dimensional space S, and treats the original image as a three-dimensional original image. That is, the display control unit 34 places the original image in the virtual area 75 that is represented by three-dimensional coordinates in the virtual three-dimensional space S, and treats the original image as a three-dimensional original image. Then, the display control unit 34 displays a superimposition image in which the background image and a two-dimensional original image that is formed by projecting the three-dimensional original image, which is formed by placing the original image in the virtual area 75, onto a two-dimensional space visually confirmed from the predetermined viewpoint position I, are superimposed, on the display unit 20.

The viewpoint position I represents the position in the negative Z-axis direction (the direction from the origin O toward the viewpoint position I) along the perpendicular with respect to the original surface 54 that is temporarily placed at the reference position in the virtual three-dimensional space S. The viewpoint position I can be changed to an arbitrary user-specified position using OpenGL processing.

The display control unit 34 includes a projecting unit 34A, a straight line drawing unit 34B, an auxiliary line drawing unit 34C, a light source reflection control unit 34D, a permeability control unit 34E, and a blur control unit 34F.

The explanation about the permeability control unit 34E and the blur control unit 34F is given later.

The straight line drawing unit 34B draws the straight lines L (the straight lines L1 to L17), which are included in the background image 74 and which are detected by the detecting unit 26A, at the respective positions in the background image 74. Then, the straight line drawing unit 34B displays the background image 74 in which the straight lines L are drawn, on the display unit 20.

The projecting unit 34A receives the following: the original image, the background image 74; the three-dimensional coordinates (the initial placement coordinates) of the four vertices of the original surface 54 that is temporarily placed in the virtual three-dimensional space S; the latest inclination/position matrix as MODEL-VIEW matrix in OpenGL; the projective matrix B as PROJECTION matrix in OpenGL; and the light source information received by the receiving unit 24.

Then, using OpenGL, the projecting unit 34A places a virtual light source corresponding to the received light source information in the virtual three-dimensional space S, and places the original image in the virtual area 75 in the virtual three-dimensional space S in a corresponding manner to the display area 80 in the two-dimensional space; and treats the resultant image as the three-dimensional original image. At that time, the light source reflection control unit 34D adds, to the three-dimensional original image, a light source effect corresponding to the light source information. The addition of a light source effect can be done using OpenGL.

Then, the projecting unit 34A projects the three-dimensional original image onto the two-dimensional space that is visually confirmed from the predetermined viewpoint position I, and generates a two-dimensional original image. Subsequently, the projecting unit 34A performs control to generate a superimposition image in which the two-dimensional original image is superimposed on the background image, and to display the superimposition image on the display unit 20.

More specifically, the projecting unit 34A moves the original surface 54, which is temporarily placed in the virtual three-dimensional space S, to the position that has the three-dimensional coordinates of the virtual area 75 as calculated by the fourth calculating unit 30G. The projecting unit 34A applies the inclination/position matrix, which is received from the calculating unit 30, at the positions of the four vertices of the original surface 54; and calculates the three-dimensional coordinates of the four vertices of the virtual area 75 in the virtual three-dimensional space S. Accordingly, the projecting unit 34A moves the positions of the four vertices of the original surface 54 to the positions of the four vertices of the virtual area 75.

In other words, the projecting unit 34A moves a two-dimensional original surface 54A, which is formed when the original surface 54 that is temporarily placed in the virtual three-dimensional space S is projected onto a two-dimensional space, to the display area 80 that is set. Then, the projecting unit 34A calculates the three-dimensional coordinates of the four vertices of the virtual area 75, which represents the display area 80 placed in the virtual three-dimensional space S.

Then, the projecting unit 34A makes use of the three-dimensional coordinates of the four vertices of the virtual area 75 in the virtual three-dimensional space S as the three-dimensional coordinates of the four vertices of the three-dimensional original image. Thus, the projecting unit 34A does the placement in such a way that, in the virtual three-dimensional space S, the four vertices of the virtual area 75 expressed using three-dimensional coordinates (that is, the four vertices of the post-movement original surface 54) match with the four vertices of the original image, and treats the resultant image as the three-dimensional original image.

Subsequently, the projecting unit 34A projects the three-dimensional original image onto the two-dimensional space visually confirmed from the predetermined viewpoint position I, and treats the resultant image as the two-dimensional original image. Herein, the projecting unit 34A applies the projective matrix B to the three-dimensional coordinates of the four vertices of the three-dimensional original image to projects the three-dimensional image onto the two-dimensional space, and obtains the two-dimensional original image. Then, the projecting unit 34A displays a superimposition image in which the two-dimensional original image is superimposed on the background image 74, on the display unit 20.

Meanwhile, the background image 74 can be drawn using OpenGL; and superimposition can be done by creating a display layer of the background image 74, forming an OpenGL display layer on that display layer, and having permeability excluding the portion equivalent to the original image.

Figure 11:
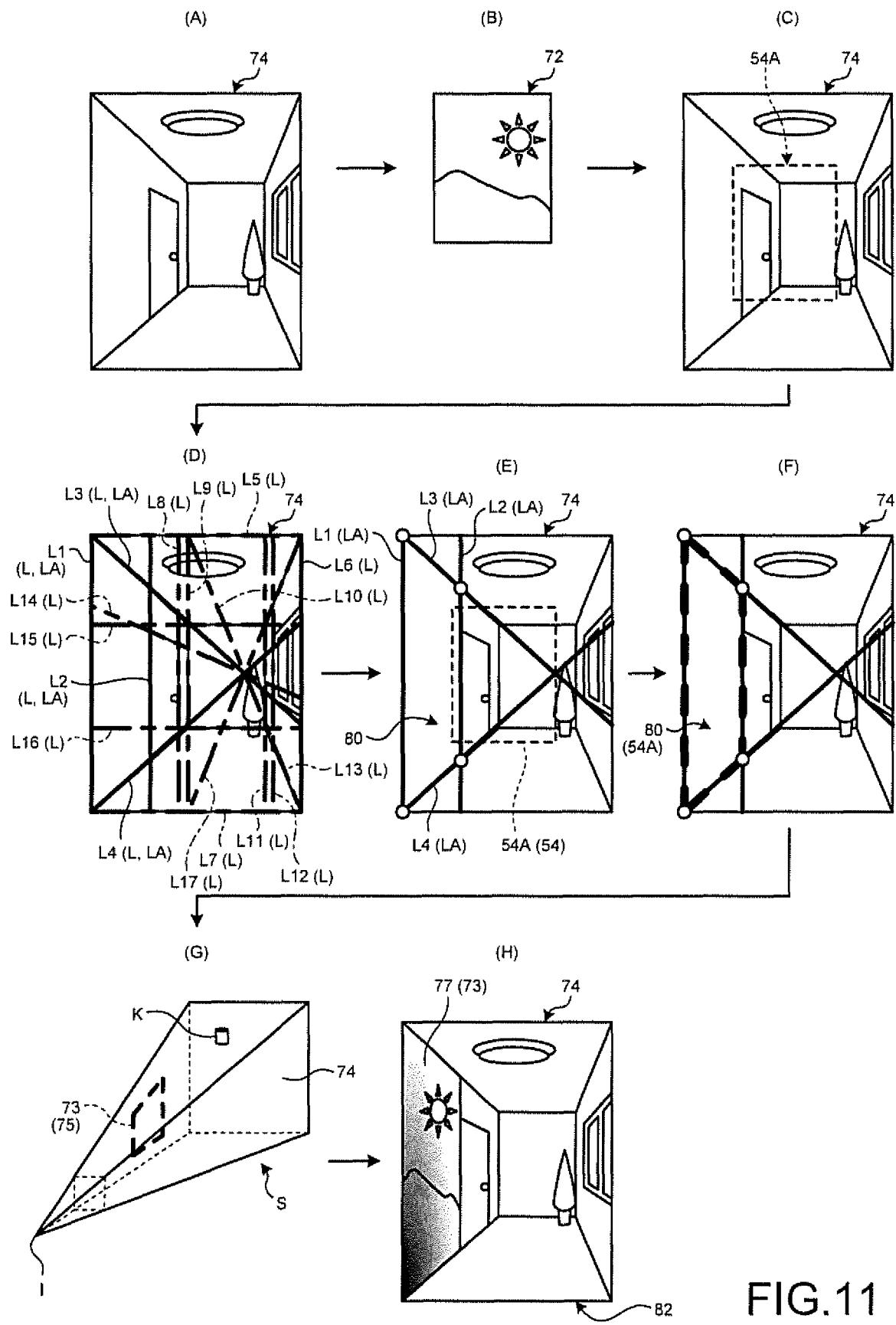
FIG. 11 is a schematic diagram illustrating a flow of operations performed during a display operation for displaying a superimposition image.

FIG. 11 is a schematic diagram illustrating a flow of operations during the display operation performed by the image processing unit 14 for displaying a superimposition image 82.

Firstly, the obtaining unit 22 obtains the background image 74 and an original image 72 (see FIG. 11(A) and FIG. 11(B)). Moreover, the receiving unit 24 receives the light source information.

Then, the calculating unit 30 calculates the three-dimensional coordinates of the original surface 54, which is temporarily placed at a predetermined reference position in the virtual three-dimensional space S (see FIG. 11(C)). At that time, the display control unit 34 can generate the two-dimensional original surface 54A, which is formed when the original surface 54 that is temporarily placed in the virtual three-dimensional space S is projected onto a two-dimensional space; superimpose the two-dimensional original surface 54A on the background image 74; and display the superimposition result on the display unit 20.

Subsequently, the detecting unit 26A of the setting unit 26 detects a plurality of straight lines L (the straight lines L1 to L17) included in the background image 74 (see FIG. 11(D)). The straight line drawing unit 34B of the display control unit 34 draws the straight lines L (the straight lines L1 to L17), which are detected by the detecting unit 26A, in the background image 74 and then displays the background image on the UI unit 19. As a result, on the UI unit 19 is displayed the background image 74 in which the straight lines (the straight lines L1 to L17) are drawn as illustrated in FIG. 11(D).

The user operates the UI unit 19 while referring to the displayed straight lines L (the straight lines L1 to L17), and selects four straight lines (for example, the straight lines L1 to L4) which express the sense of perspective in the background image 74 and which pass through the four sides constituting a rectangular area in the background image 74.

Then, the managing unit 26B sets the received four straight lines L (the straight lines L1 to L4) as the reference straight lines LA (see FIG. 11(E)).

The calculating unit 30 calculates the display area 80, which is a rectangular area formed by the four reference straight lines LA (the straight lines L1 to L4) (see FIG. 11(E)). That is, the calculating unit 30 identifies the two-dimensional coordinates of each of the four vertices (the vertices a, b, c, and d) of the display area 80 to calculate the display area 80.

Then, the calculating unit 30 moves the two-dimensional original surface 54A, which is formed when the original surface 54 that is temporarily placed in the virtual three-dimensional space S is projected onto a two-dimensional space, in the display area 80 in the background image 74 (see FIGS. 11(E) and 11(F)). Subsequently, the calculating unit 30 calculates the virtual area 75 that is present in the virtual three-dimensional space S in a corresponding manner to the display area 80 in the two-dimensional space (see FIG. 11(G)).

The display control unit 34 projects a three-dimensional original image 73, which is formed by placing the original image 72 in the virtual area 75 in the virtual three-dimensional space S, onto the two-dimensional space that is visually confirmed from the viewpoint image I (see FIG. 11(G)). At that time, the display control unit 34 gives a light source effect using a virtual light source K.

Consequently, the display control unit 34 generates a two-dimensional original image 77 in which the three-dimensional original image 73 is projected onto the two-dimensional space (see FIG. 11(H)). Then, the display control unit 34 displays the superimposition image 82 formed by superimposing the two-dimensional original image 77 on the background image 74, on the display unit 20 (see FIG. 11(H)).

Hence, on the UI unit 19, the superimposition image 82 is displayed in which the two-dimensional original image 77 in the background image 74 is placed in such a way that the two-dimensional original image 77 has identical position, identical shape, and identical size to the display area 80 formed by the four sides which express the sense of perspective in the background image 74 and which pass through the four sides constituting a rectangular area in the background image 74.

For that reason, in the image processing device 10 according to the present embodiment, the original image 72 can be easily placed to express the sense of perspective in the background image 74.

When the superimposition image 82 is displayed on the display unit 20, it becomes possible for the user to operate the input unit 18 and move the position of the two-dimensional original image 77, which is included in the superimposition image 82, to an arbitrary position on the display surface of the display unit 20.

For example, the user operates the screen of the UI unit 19 that is configured as a touch-sensitive panel, touches on or around the displayed two-dimensional original image 77, and drags the two-dimensional original image 77 to an arbitrary destination.

When the user touches on or around the two-dimensional original image 77, the receiving unit 24 receives movement start information indicating a movement start instruction from the UI unit 19.

During a dragging operation, every time new two-dimensional coordinates are specified, the receiving unit 24 receives the newly-specified two-dimensional coordinates. Moreover, when the user ends the dragging operation, the receiving unit 24 receives movement end information indicating the end of movement.

During a dragging operation, every time new two-dimensional coordinates are specified, the calculating unit 30 receives the newly-specified two-dimensional coordinates of the two-dimensional original image 77. Then, in an identical manner to the explanation given earlier, the calculating unit 30 calculates the virtual area 75 present in the virtual three-dimensional space S in a corresponding manner to the area of the two-dimensional original image 77 represented by the received two-dimensional coordinates of the two-dimensional original image 77, that is, represented by the post-movement two-dimensional coordinates. Hence, in response to the movement of the two-dimensional original image 77 on the UI unit 19 due to the dragging operation, the calculating unit 30 calculates such a three-dimensional position in the virtual three-dimensional space S which corresponds to the two-dimensional position of the two-dimensional original image 77 being moved as the new virtual area 75.

Then, every time the virtual area 75 is newly calculated, the display control unit 34 projects the three-dimensional original image 73, which is formed by placing the original image 72 in the calculated virtual area 75, onto the two-dimensional space; and displays the superimposition image 82 on the display unit 20 in an identical manner to the explanation given earlier.

More particularly, the calculating unit 30 includes the moving unit 30H (see FIG. 6).

For example, when a dragging operation is performed to drag the two-dimensional original image 77 that is included in the superimposition image 82 displayed on the UI unit 19, the display control unit 34 activates the moving unit 30H. Herein, the moving unit 30H receives the movement start information; the two-dimensional coordinates newly specified during the dragging operation; and the movement end information from the input unit 18 via the receiving unit 24.

Figure 12:
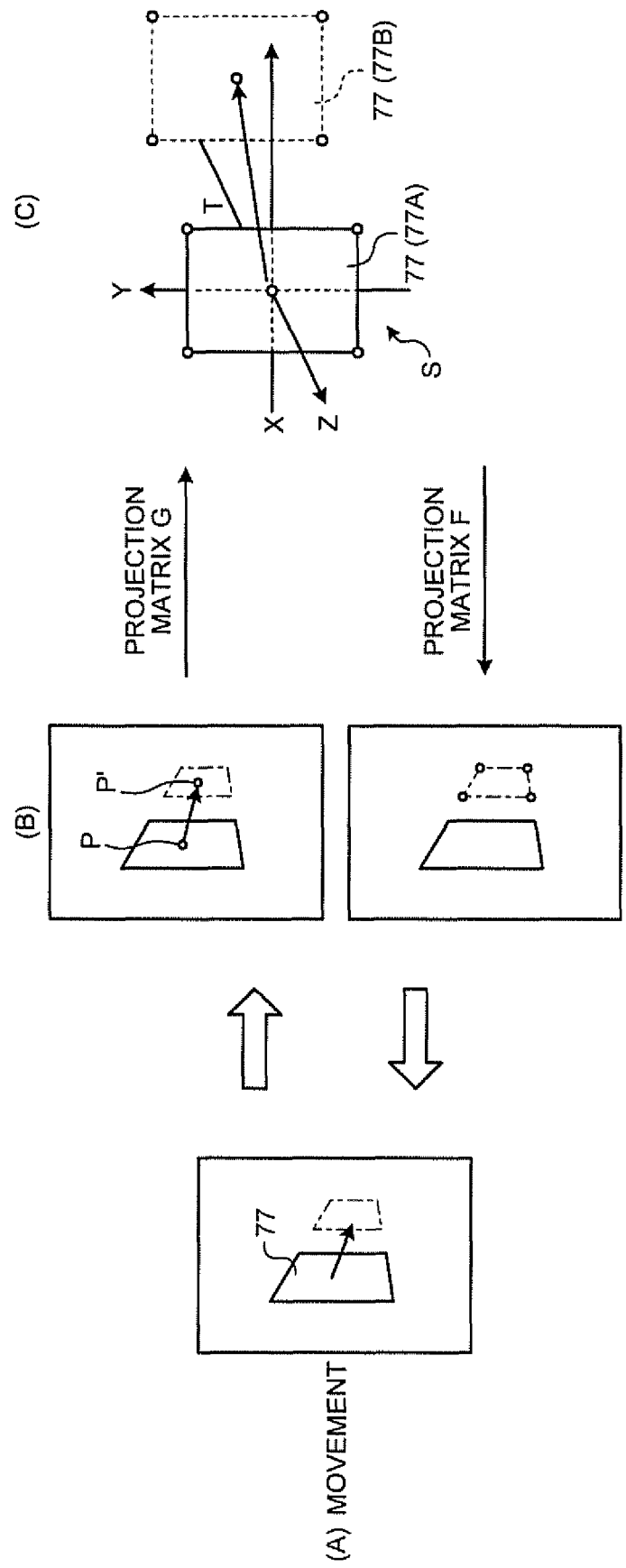
FIG. 12 is an explanatory diagram for explaining the movement of a two-dimensional original image.

FIG. 12 is an explanatory diagram for explaining the movement of the two-dimensional original image 77. The moving unit 30H stores the two-dimensional coordinates at the start of the dragging operation. Moreover, the setting unit 26 obtains the two-dimensional coordinates of the four vertices of the pre-movement two-dimensional original image 77 and obtains a gravity point P from the setting unit 26 (see FIG. 12(B)).

Meanwhile, instead of obtaining the gravity point P, the moving unit 30H may obtain one of the four vertices or may obtain an arbitrary point. More particularly, such an arbitrary point can be obtained which enables calculation of object coordinates of each of the four vertices of the two-dimensional original image 77 from the arbitrary point. Herein, the explanation is given for a case of using the gravity point P that is easy to control.

Then, the moving unit 30H holds the two-dimensional coordinates of the gravity point P of the two-dimensional original image 77 at the start of the dragging operation.

Subsequently, during the dragging operation performed by the user, the moving unit 30H deducts the two-dimensional coordinates at the start of the dragging operation from the current coordinates (i.e., the two-dimensional coordinates instructed at present) and calculates a movement vector on the display surface of the display unit 20. Then, the moving unit 30H adds the calculated movement vector to the gravity point P at the start of the dragging operation, and calculates the two-dimensional coordinates of a current gravity point P' (see FIG. 12(B)).

Then, the moving unit 30H applies the projection matrix G, which is held by the calculating unit 30, to the position of the current gravity point P'; and calculates the position of the two-dimensional original image 77 in the virtual three-dimensional space S. At the time of this calculation, the value of the Z-coordinate is equal to zero. Consequently, the two-dimensional original image 77 moves from the position of a two-dimensional original image 77A to the position of a two-dimensional original image 77B in the XY plane of the virtual three-dimensional space S (see FIG. 12(C)).

For that reason, at the time when the display control unit 34 displays the superimposition image 82, the two-dimensional original image 77 moves in the XY plane. Herein, the matrix indicating the movement from the position of the two-dimensional original image 77A to the position of the two-dimensional original image 77B is referred to as a matrix T. The moving unit 30H can multiply the inclination/position matrix, which is calculated by the second calculating unit 30C, with the matrix T and send the resultant matrix (RT×T) as the new inclination/position matrix to the fourth calculating unit 30G and the display control unit 34. Herein, RT represents the inclination/position matrix.

Moreover, the calculating unit 30 can calculate two-dimensional coordinates using the matrix T and send the calculated result as the new display area 80 (the post-modification display area 80) to the setting unit 26.

In this way, the user can easily move the two-dimensional original image 77 that is included in a preview image, and thus can easily confirm the changes in the reflection position of the virtual light source K placed in the virtual three-dimensional space S.

Meanwhile, it is desirable that, when the movement start information regarding the two-dimensional original image 77 is received, the display control unit 34 calculates a plurality of auxiliary lines formed by extending the two-dimensional original image 77 in the superimposition image 82. Moreover, it is desirable that, when the movement start information is received, the display control unit 34 displays the superimposition image 82 formed by superimposing the two-dimensional original image 77 and the auxiliary lines on the background image 74, on the display unit 20.

For that reason, in the present embodiment, it is desirable that the image processing unit 14 further includes the auxiliary line calculating unit 28 (see FIG. 2). Moreover, it is desirable that the display control unit 34 includes the auxiliary line drawing unit 34C.

FIGS. 13A to 13D are explanatory diagrams for explaining auxiliary line calculation and auxiliary line drawing.

Figure 13A:
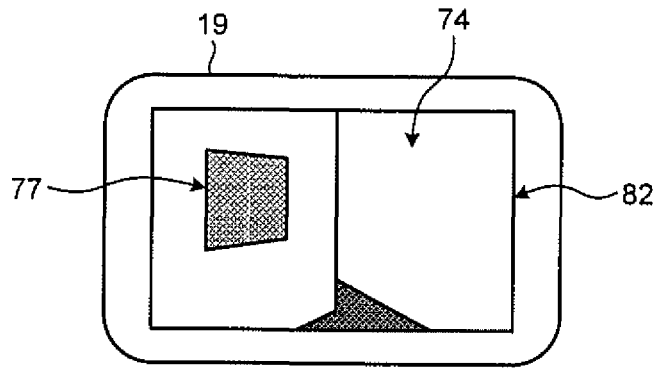
FIGS. 13A to 13D are explanatory diagrams for explaining auxiliary line calculation and auxiliary line drawing.
Figure 13B:
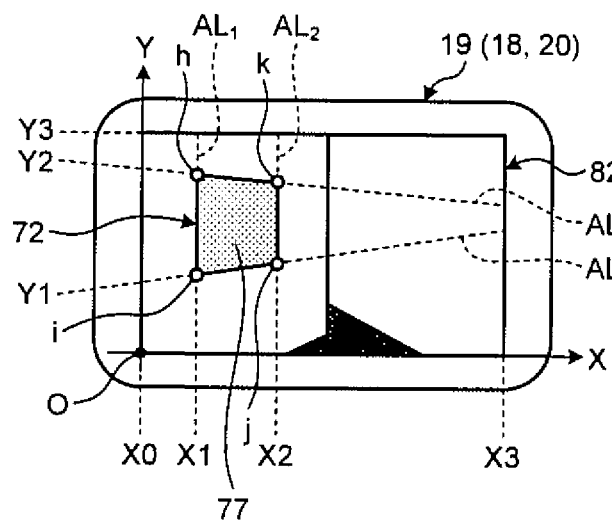

For example, assume that the superimposition image 82 that is formed by superimposing the two-dimensional original image 77 on the background image 74 is being displayed on the UI unit 19 (see FIG. 13A). Then, if the two-dimensional original image 77 is touched as a result of a user operation of the UI unit 19, the movement start information indicating a movement start instruction with respect to the two-dimensional original image 77 is output to the image processing unit 14.

The receiving unit 24 of the image processing unit 14 receives the movement start information indicating the start of the movement of the two-dimensional original image 77. When the receiving unit 24 receives the movement start information, the auxiliary line calculating unit 28 calculates a plurality of auxiliary lines AL (auxiliary lines $AL_1$ to $AL_4$) formed by extending the four sides of the two-dimensional original image 77 in the superimposition image 82 (see FIG. 13B). However, there is no restriction on the line type of the auxiliary lines AL. Examples of the line type of the auxiliary lines AL include the single line and the grid line.

Meanwhile, both ends of each auxiliary line AL abuts against the outer frame of the background image 74.

For example, the auxiliary line calculating unit 28 can perform the calculation using the two-dimensional coordinates of the four vertices of the two-dimensional original image 77 being displayed. For example, consider a two-dimensional plane (XY plane) in which one of the four vertices of the rectangular display surface of the UI unit 19 represents the origin O. Moreover, assume that four vertices of the two-dimensional original image 77 (vertices h, i, j, and k) have the two-dimensional coordinates of (X1, Y2), (X1, Y1), (X2, Y1), and (X2, Y2). Herein, it is assumed that X1<X2 and Y1<Y2 holds true.

In this case, the auxiliary line calculating unit 28 calculates an auxiliary line AL (refer to the auxiliary line $AL_3$) that is a straight line passing through the vertices h and k, that has the start point at the position at which the two-dimensional coordinates of the display surface of the UI UNIT 19 exhibit X=0, and that has the end point at the position at which the two-dimensional coordinates of the display surface of the UI UNIT 19 exhibit X=3. In an identical manner, the auxiliary line calculating unit 28 calculates the auxiliary lines $AL_1$, $AL_2$, and $AL_4$.

In this way, the auxiliary line calculating unit 28 calculates a plurality of auxiliary lines (the auxiliary lines $AL_1$ to $AL_4$) formed by extending the four sides of the two-dimensional original image 77 in the superimposition image 82.

Then, the auxiliary line drawing unit 34C of the display control unit 34 generates the superimposition image 82 in which the auxiliary lines AL (the auxiliary lines $AL_1$ to $AL_4$)

calculated by the auxiliary line calculating unit 28 are also superimposed, and displays the superimposition image 82 on the UI unit 19.

Hence, when movement of the two-dimensional original image 77 is instructed by a user operation of the UI unit 19, the four auxiliary lines (the auxiliary lines $AL_1$ to $AL_4$), which are formed by extending the four sides of the two-dimensional original image 77 being displayed, are displayed on the UI unit 19.

When movement of the two-dimensional original image 77 is not instructed by a user operation of the UI unit 19, the two-dimensional original image 77 displayed on the UI unit 19 is an image having the four sides along the straight lines L that express the sense of perspective in the background image 74 (i.e., along the reference straight lines LA).

Figure 13C:
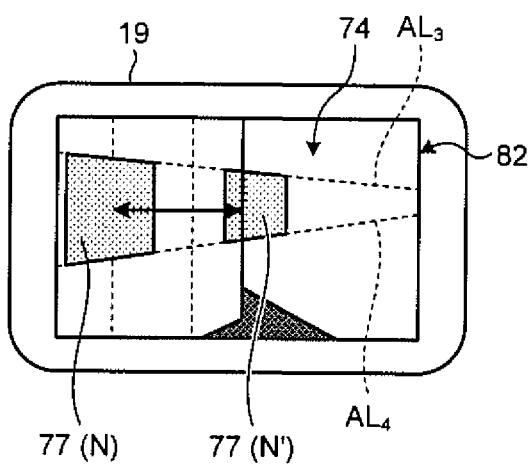
Figure 13D:
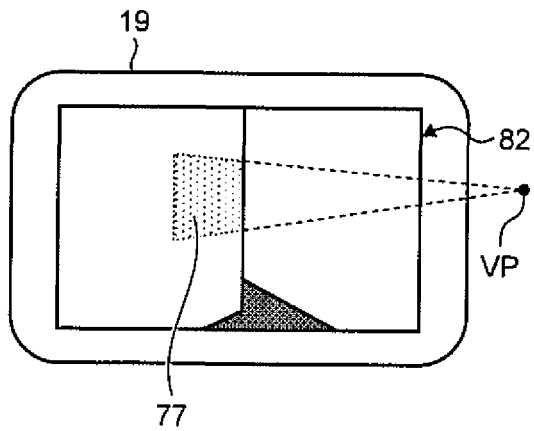

Hence, as a result of drawing the auxiliary lines AL in the two-dimensional original image 77 and then displaying the two-dimensional original image 77, the user becomes able to move the two-dimensional original image 77 in the background image 74 without losing the sense of perspective indicated in the background image 74 (see FIG. 13C).

Meanwhile, during the period of time between the reception of the movement start information regarding the two-dimensional original image 77 by the receiving unit 24 and the reception of the movement end information regarding the two-dimensional original image 77 by the receiving unit 24, it is desirable that the superimposition image 82 in which the two-dimensional original image 77 and the auxiliary lines AL of the two-dimensional original image 77 are superimposed on the background image 74 is displayed on the UI unit 19.

As a result, in the image processing device 10, while ensuring that the sense of perspective indicated in the background image 74 is not lost, the two-dimensional original image 77 can be moved within the background image 74 to the position specified in a movement instruction by the user.

Meanwhile, it is desirable that the display control unit 34 includes the permeability control unit 34E, which adjusts the permeation rate of the two-dimensional original image 77 to be higher than the permeation rate of the background image 74 during the period of time between the reception of the movement start information and the reception of the movement end information. Herein, the permeability control unit 34E corresponds to a first adjusting unit.

For example, the permeability control unit 34E adds a semipermeable effect to the two-dimensional original image 77, and adjusts the permeation rate of the two-dimensional original image 77 to be higher than the permeation rate of the background image 74. The semipermeable effect is implemented using a known technology that applies alpha blend. Moreover, at the time of adding a semipermeable effect, it is also possible to utilize an image processing engine such as OpenCV.

It is also desirable that the display control unit 34 includes the blur control unit 34F. The blur control unit 34F adjusts the resolution of the two-dimensional original image 77 in such a way that, closer the two-dimensional original image 77 to the vanishing point VP in the background image 74, the further lower is the resolution of the two-dimensional original image 77 than the resolution of the background image 74. As a result, the blur control unit 34F can perform adjustment in such a way that, closer the position of placement of the two-dimensional original image 77 to the vanishing point VP in the background image 74, the greater is the degree of blurring of the displayed two-dimensional original image 77 (see FIG. 13D).

For example, the blur control unit 34F can apply a Gaussian filter, which utilizes a graphics engine such as OpenGL to give a blurring effect using a known Gaussian function, to a fragment shader; and can adjust the resolution of the two-dimensional original image 77.

In this way, in the image processing unit 14 according to the present embodiment, when movement of the two-dimensional original image 77 is instructed due to a user operation of the UI unit 19, the four auxiliary lines (the auxiliary lines $AL_1$ to $AL_4$), which are formed by extending the four sides of the two-dimensional original image 77 being displayed, are displayed on the UI unit 19.

Figure 14A:
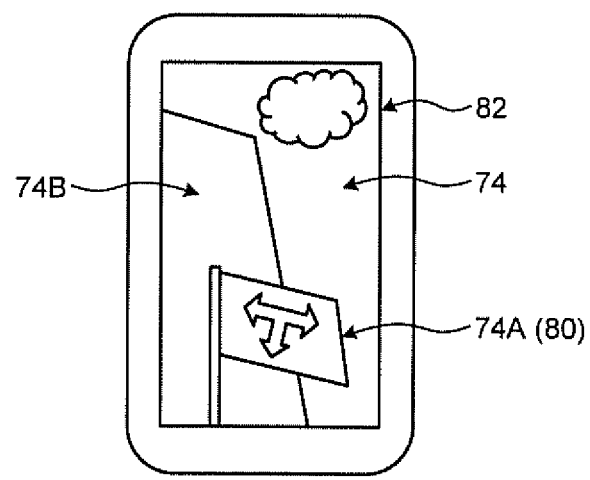
FIGS. 14A to 14C are explanatory diagrams for explaining the effect achieved by displaying auxiliary lines.
Figure 14B:
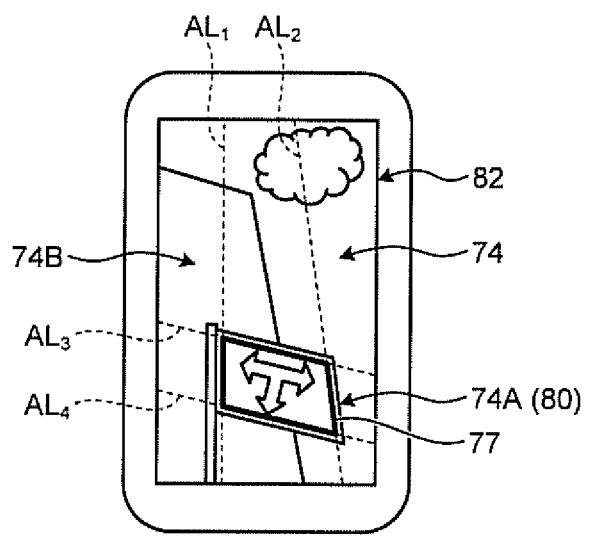
Figure 14C:
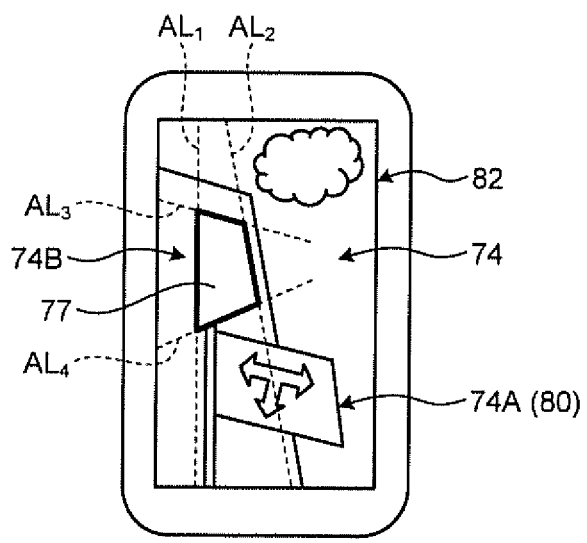

FIGS. 14A to 14C are explanatory diagrams for explaining the effect achieved by displaying the auxiliary lines AL.

The display of the auxiliary lines AL is particularly effective in the case in which the position of the display area 80, which is formed by the reference straight lines LA, in the background image 74 is different than the position at which the user wishes to place the original image 72 in the background image 74.

For example, as illustrated in FIG. 14A, assume that the display area 80 formed by the reference straight lines LA is positioned at an area 74A of a sign included in the background image 74. As described earlier, the reference straight lines LA represent the straight lines L expressing the sense of perspective in the background image 74. Hence, if the two-dimensional original image 77 is placed to match with the display area 80, then the two-dimensional original image 77 can be placed in a manner expressing the sense of perspective.

However, assume that the area in which the user wishes to place the two-dimensional original image 77 is not the area 74A of a sign but is an area 74B of a building included in the background image 74. In such a case, when the user touches the area on the UI unit 19 in which the two-dimensional original image 77 is displayed, a movement start instruction is output from the UI unit 19 to the image processing unit 14.

Hence, the image processing unit 14 displays the superimposition image 82 in which the auxiliary lines AL (the auxiliary lines $AL_1$ to $AL_4$) which are formed by extending the four sides of the two-dimensional original image 77, is further superimposed, on the UI unit 19 (see FIG. 14B and FIG. 14C).

For that reason, if the user moves the display position of the two-dimensional original image 77 while referring to the displayed auxiliary lines AL, the display position of the two-dimensional original image 77 can be moved to another position (for example, the area 74B of the building; see FIG. 14C) while ensuring that the sense of perspective indicated in the background image 74 is not lost.

Meanwhile, it is desirable that, during the movement or deformation of the two-dimensional original image 77, the display control unit 34 can set such auxiliary lines AL, from among the auxiliary lines AL passing through the four sides constituting the two-dimensional original image 77, which have maintained the relation of parallelism with the reference straight lines expressing the sense of perspective to have a different display format than the auxiliary lines AL not maintaining such relation of parallelism. Examples of the different display format include at least one of the line type, the color, and a superimposed display of a message image.

As a result, the image processing device 10 can easily present to the user about whether or not the four sides of the two-dimensional original image 77 are maintaining the relation of parallelism with the straight lines L expressing the sense of perspective (the reference straight lines LA) in the background image 74.

Meanwhile, while the two-dimensional original image 77 is being moved, the permeation rate of the two-dimensional original image 77 can be lowered than the permeation rate of the background image 74. Consequently, while confirming the positions and the inclination of the reference straight lines LA in the background image 74, the user can easily move/deform the two-dimensional original image 77 while ensuring that the sense of perspective indicated in the background image 74 is maintained.

Given below is the explanation of a sequence of operations performed in the image processing unit 14 for displaying the superimposition image 82. FIG. 15 is a sequence diagram illustrating an exemplary sequence of operations performed in the image processing unit 14 for displaying the superimposition image 82.

Firstly, the obtaining unit 22 obtains the background image 74 and the original image 72 (SEQ 100). Then the obtaining unit 22 stores the background image 74 and the original image 72 in the memory unit 16 (SEQ 102).

Subsequently, the receiving unit 24 receives light source information (SEQ 104) and stores the light source information in the memory unit 16 (SEQ 106).

Then, the obtaining unit 22 obtains the background image 74, the original image 72, and the light source information from the memory unit 16 (SEQ 108, SEQ 110, SEQ 112, and SEQ 114).

Subsequently, using the original image 72, the calculating unit 30 calculates the three-dimensional coordinates of the original surface 54, which is temporarily placed at the predetermined reference position in the virtual three-dimensional space S (SEQ 116 and SEQ 118).

Then, the detecting unit 26A detects a plurality of straight lines L (the straight lines L1 to L17) included in the background image 74 (SEQ 120). Subsequently, the detecting unit 26A outputs the detected straight lines L to the straight line drawing unit 34B (SEQ 122).

The straight line drawing unit 34B draws the straight lines L (the straight lines L1 to L17), which are detected by the detecting unit 26A, in the background image 74 (SEQ 124) and displays the background image 74 on the UI unit 19 (SEQ 126 and SEQ 128). As a result, on the UI unit 19, the background image 74 with the straight lines L (the straight lines L1 to L17) drawn thereon is displayed.

The user operates the UI unit 19 while referring to the displayed straight lines L (the straight lines L1 to L17), and selects four straight lines L (the straight lines L1 to L4) which express the sense of perspective in the background image 74 and which pass through the four sides constituting a rectangular area in the background image 74.

The managing unit 26B receives the user selection of the straight lines L from the UI unit 19 via the receiving unit 24 (SEQ 130 and SEQ 132). Then, the managing unit 26B sets the received four straight lines L (the straight lines L1 to L4) as the reference lines LA (SEQ 134).

The calculating unit 30 calculates the display area 80 that represents a rectangular formed in the two-dimensional space by the four reference lines LA (the straight lines L1 to L4). That is, the calculating unit identifies the two-dimensional coordinates of the four vertices of the display area 80. Then, the calculating unit 30 calculates the virtual area 75 that is present in the virtual three-dimensional space S in a corresponding manner to the display area 80 in the two-dimensional space (SEQ 136 and SEQ 138). Subsequently, the calculating unit 30 outputs the information indicating the three-dimensional position of the virtual area 75 to the projecting unit 34A (SEQ 140).

The display control unit 34 places an original image in the virtual area 75 in the virtual three-dimensional space S (SEQ 142). The light source reflection control unit 34D adds a light source effect corresponding to the light source information to the three-dimensional original image 73, which is obtained by placing the original image in the virtual area 75, using the virtual light source K (SEQ 144 and SEQ 146).

The projecting unit 34A projects the three-dimensional original image 73 onto the two-dimensional space that is visually confirmed from the viewpoint position I (SEQ 148). Then, the projecting unit 34A superimposes the two-dimensional original image 77, which is obtained by the projection of the three-dimensional original image 73, on the background image 74 and displays the superimposition image 82 on the UI unit 19 (SEQ 150 and SEQ 152).

Figure 16:
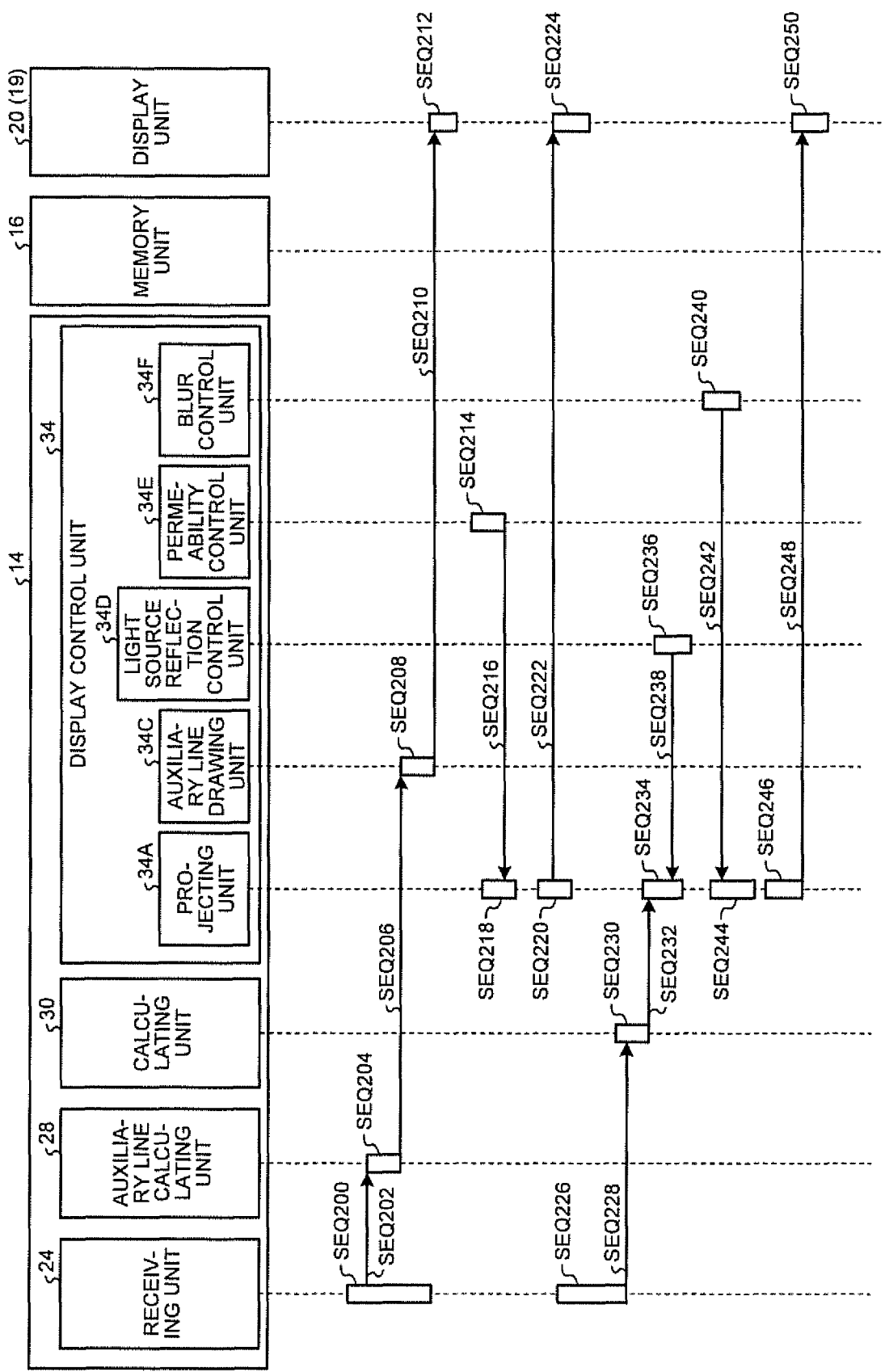
FIG. 16 is a sequence diagram illustrating an exemplary sequence of operations performed for moving a two-dimensional original image.

Given below is the explanation of the operations performed in the image processing unit 14 in response to the reception of movement start information indicating a movement start instruction with respect to the two-dimensional original image 77. FIG. 16 is a sequence diagram illustrating an exemplary sequence of operations performed in the image processing unit 14 for moving the two-dimensional original image 77.

Firstly, when the user touches on or around the two-dimensional original image 77 in the superimposition image 82 displayed on the UI unit 19; the receiving unit 24 receives, from the UI unit 19, the movement start information indicating a movement start instruction (SEQ 200 and SEQ 202).

When the receiving unit 24 receives the movement start information, the auxiliary line calculating unit 28 calculates a plurality of auxiliary lines AL (the auxiliary lines $AL_1$ to $AL_4$) formed by extending the four sides of the two-dimensional original image 77 in the superimposition image 82 (SEQ 204). Then, the auxiliary line calculating unit 28 outputs auxiliary line information of the calculated auxiliary lines AL to the auxiliary line drawing unit 34C (SEQ 206).

The auxiliary line drawing unit 34C generates the superimposition image 82 in which the two-dimensional original image 77 and the auxiliary lines AL (the auxiliary lines $AL_1$ to $AL_4$), which are specified in the auxiliary line information received from the auxiliary line calculating unit 28, are superimposed in that order on the background image 74 (SEQ 208); and displays the superimposition image 82 on the UI unit 19 (SEQ 210 and SEQ 212).

Subsequently, the permeability control unit 34E adjusts the permeation rate of the two-dimensional original image 77 to be higher than the permeation rate of the background image 74 (SEQ 214 and SEQ 216). The projecting unit 34A superimposes the two-dimensional original image 77 having the permeation rate changed by the permeability control unit 34E and the auxiliary lines AL drawn by the auxiliary line drawing unit 34C in that order on the background image 74, and displays the superimposition image 82 on the UI unit 19 (SEQ 218, SEQ 220, SEQ 222, and SEQ 224).

During the dragging operation, every time new two-dimensional coordinates are specified, the receiving unit 24 receives the newly-specified two-dimensional coordinates (SEQ 226 and SEQ 228).

During the dragging operation, every time new two-dimensional coordinates are specified, the calculating unit 30 receives the newly-specified two-dimensional coordinates of the two-dimensional original image 77. Then, the calculating unit 30 calculates the virtual area 75 that is present in the virtual three-dimensional space S in a corresponding manner to the area of the two-dimensional original image 77 represented by the received two-dimensional coordinates of the two-dimensional original image 77, that is, represented by the post-movement two-dimensional coordinates. Hence, in response to the movement of the two-dimensional original image 77 on the UI unit 19 due to the dragging operation, the calculating unit 30 calculates such a three-dimensional position in the virtual three-dimensional space S which corresponds to the two-dimensional position of the two-dimensional original image 77 being moved as the new virtual area 75 (SEQ 230).

The calculating unit 30 outputs the information indicating the three-dimensional position of the virtual area 75 to the projecting unit 34A (SEQ 232).

Every time the virtual area 75 is newly calculated, the display control unit 34 places the original image in the calculated virtual area 75 (SEQ 234). The light source reflection control unit 34D adds a light source effect corresponding to the light source information to the three-dimensional original image 73, which is obtained by placing the original image in the virtual area 75, using the virtual light source K (SEQ 236 and SEQ 238).

The blur control unit 34F adjusts the resolution of the two-dimensional original image 77 in such a way that, closer the two-dimensional original image 77 to the vanishing point VP in the background image 74, the further lower is the resolution of the two-dimensional original image 77 than the resolution of the background image 74 (SEQ 240 and SEQ 242).

The projecting unit 34A projects the three-dimensional original image 73, which has been added with a light source effect and subjected to resolution adjustment, onto the two-dimensional space that is visually confirmed from the viewpoint position I (SEQ 244). Then, the projecting unit 34A superimposes the two-dimensional original image 77, which is obtained by the projection of the three-dimensional original image 73, on the background image 74 and displays the superimposition image 82 on the UI unit 19 (SEQ 246, SEQ 248, and SEQ 250).

When the user ends the dragging operation, the receiving unit 24 receives movement end information indicating the end of movement. In that case, the operations can be performed in an identical manner to the operations from SEQ 226 to SEQ 248 other than that the display control unit 34 neither draws the auxiliary lines AL nor uses the blur control unit 34F to lower the resolution of the two-dimensional original image 77.

Figure 17:
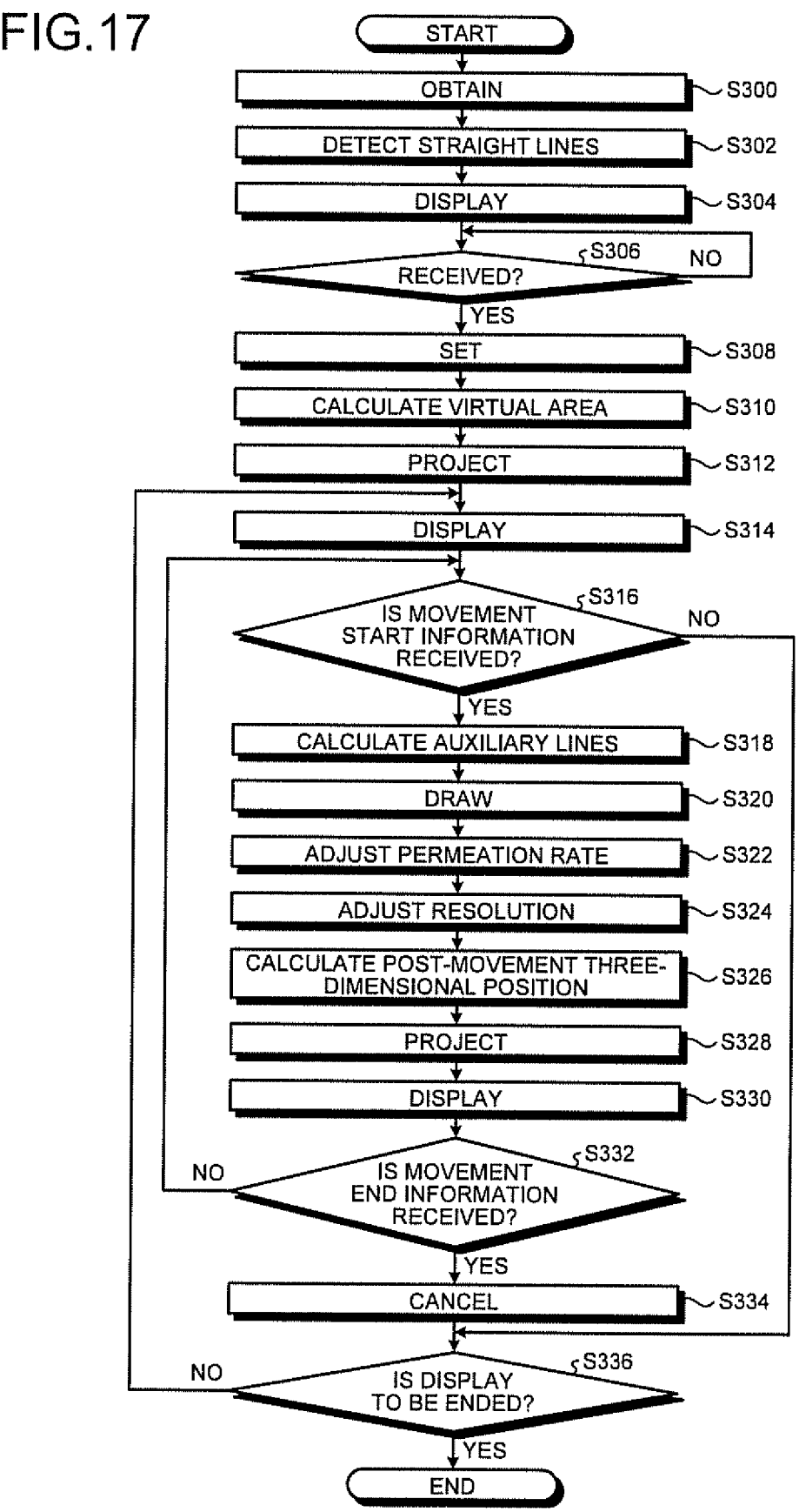
FIG. 17 is a flowchart for explaining an exemplary sequence of operations performed during image processing.

Given below is the explanation of a sequence of operations during the image processing performed by the image processing unit 14. FIG. 17 is a flowchart for explaining an exemplary sequence of operations during the image processing performed by the image processing unit 14.

Firstly, the obtaining unit 22 obtains the background image 74, the original image 72, and the light source information (Step S300).

Then, the detecting unit 26A detects a plurality of straight lines L included in the background image 74 (Step S302).

Subsequently, the straight line drawing unit 34B draws a plurality of straight lines (the straight lines L1 to L17), which are detected at Step S302, on the background image 74; and displays the background image 74 on the UI unit 19 (Step S304).

Then, until the information indicating the four straight lines L (the straight lines L1 to L4), which express the sense of perspective in the background image 74 and which constitute a rectangular area in the background image 74, is received from the UI unit 19 via the receiving unit 24; the managing unit 26B repeatedly determines that the information is not received (No at Step S306). When the information indicating the four straight lines L is received (Yes at Step S306), the system control proceeds to Step S308.

The managing unit 26B sets the four straight lines L (the straight lines L1 to L4), which are received at Step S306, as the reference straight lines LA (Step S308).

Then, the calculating unit 30 calculates the virtual area 75 that is present in the virtual three-dimensional space S in a corresponding manner to the display area 80 having the four points of intersection of the four reference straight lines LA, which are set at Step S308, as the vertices (Step S310).

Subsequently, the display control unit 34 places the original image 72 in the virtual area 75, which is calculated at Step S310, in the virtual three-dimensional space S and treats the resultant image as the three-dimensional original image 73. Then, the display control unit 34 projects the three-dimensional original image 73 onto the two-dimensional space that is visually confirmed from the predetermined viewpoint position I, and treats the resultant image as the two-dimensional original image 77 (Step S312). Moreover, the display control unit 34 superimposes the two-dimensional original image 77 on the background image 74 to generate the superimposition image 82, and displays the superimposition image 82 on the UI unit 19 (Step S314).

Then, the receiving unit 24 determines whether or not the movement start information is received from the UI unit 19 (Step S316). If the movement start information is not received (No at Step S316), then the system control proceeds to Step S336 (described later).

When the movement start information is received (Yes at Step S316), the system control proceeds to Step S318.

At Step S318, the auxiliary line calculating unit 28 calculates a plurality of auxiliary lines AL (the auxiliary lines $AL_1$ to $AL_4$), which are formed by extending the four sides of the two-dimensional original image 77 in the superimposition image 82 being displayed on the UI unit 19 (Step S318).

Then, the auxiliary line drawing unit 34C draws the auxiliary lines AL (the auxiliary lines $AL_1$ to $AL_4$), which are calculated at Step S318, on the two-dimensional original image 77 (Step S320).

Subsequently, the permeability control unit 34E adjusts the permeation rate of the two-dimensional original image 77 in the superimposition image 82, which is displayed on the UI unit 19, to be higher than the permeation rate of the background image 74 included in the superimposition image 82 (Step S322). For that reason, the two-dimensional original image 77 is adjusted to be semitransparent, for example.

Then, using the new two-dimensional coordinates of the two-dimensional original image 77 as received by the receiving unit 24, the blur control unit 34F adjusts the resolution of the two-dimensional original image 77 in such a way that, closer the two-dimensional original image 77 to the vanishing point VP in the background image 74, the further lower is the resolution of the two-dimensional original image 77 than the resolution of the background image 74 (Step S324).

Subsequently, the calculating unit 30 calculates the three-dimensional position in the virtual three-dimensional space S in a corresponding manner to the new two-dimensional coordinates of the two-dimensional original image 77 as received by the receiving unit 24 (Step S326). As a result of the operation performed at Step S326, the calculating unit 30 calculates the virtual area 75 in the virtual three-dimensional space S in a corresponding manner to the two-dimensional original image 77 present at the post-movement two-dimensional position.

Then, the projecting unit 34A projects the three-dimensional original image 73, which is formed by placing the original image 72 in the virtual area 75 positioned at the three-dimensional position calculated at Step S326, onto the two-dimensional space and obtains the two-dimensional original image 77 (Step S328).

Subsequently, the projecting unit 34A displays the superimposition image 82 formed by superimposing the background image 74 with the two-dimensional original image 77, which is subjected to permeation rate adjustment at Step S322 and resolution adjustment at Step S324 and which has moved as a result of the operation performed at Step S328, and the auxiliary lines calculated at Step S318, on the UI unit 19 (Step S330).

Then, the receiving unit 24 determines whether or not movement end information is received (Step S332). If movement end information is not received (No at Step S332), then the system control returns to Step S316.

When movement end information is received (Yes at Step S332), the system control proceeds to Step S334. At Step S334, the display control unit 34 cancels the auxiliary lines AL drawn at Step S320 and cancels the permeation rate adjusted at Step S322 (Step S334). That is, at Step S334, the display control unit 34 removes the drawing of the auxiliary lines AL from the background image 74. Moreover, at Step S334, the display control unit 34 resets the permeation rate of the two-dimensional original image 77 to the permeation rate prior to the adjustment at Step S322.

Hence, during the period of time between the reception of the movement start information and the reception of the movement end information, the superimposition image 82 including the auxiliary lines AL is displayed on the UI unit 19. Moreover, during the period of time between the reception of the movement start information and the reception of the movement end information, the two-dimensional original image 77 having a higher permeation rate than the permeation rate of the background image 74 (for example, the two-dimensional original image 77 of semitransparent nature) is displayed on the UI unit 19.

Then, at Step S336, the image processing unit 14 determines whether or not to end the operations for displaying the superimposition image 82 (Step S336). For example, as far as the determination performed at Step S336 is concerned, the receiving unit 24 of the image processing unit 14 determines whether or not instruction information indicating the end of display is received from the UI unit 19.

If the end of display is not determined (No at Step S336), then the system control returns to Step S314. When the end of display is determined (Yes at Step S336), the present routine ends.

As described above, the image processing device according to the present embodiment includes the obtaining unit 22, the setting unit 26, the calculating unit 30, and the display control unit 34. The obtaining unit 22 obtains the background image 74 and the original image 72. The setting unit 26 sets, as the reference straight lines LA, four straight lines L which express the sense of perspective in the background image 74 and which pass through the four sides constituting a rectangular area in the background image 74, from among a plurality of straight lines L included in the background image 74. The calculating unit 30 calculates the virtual area 75 in the virtual three-dimensional space S in a corresponding manner to the rectangular display area 80 having the four reference straight lines LA in the background image 74 as the four sides. The display control unit 34 displays the superimposition image 82 in which the two-dimensional original image 77, which is the resultant image when the three-dimensional original image 73 that is formed by placing the original image 72 in the virtual area 75 is projected onto the two-dimensional space visually confirmed from the predetermined viewpoint position I, is superimposed on the background image 74, on the display unit 20.

In this way, in the image processing device 10 according to the present embodiment, the two-dimensional original image 77 in the background image 74 is placed in such a way that the two-dimensional original image 77 has identical position, identical shape, and identical size to the display area 80 formed by the four sides which express the sense of perspective in the background image 74 and which pass through the four sides constituting a rectangular area in the background image 74.

Thus, in the image processing device 10 according to the present embodiment, the original image 72 can be easily placed in a manner expressing the sense of perspective indicated in the background image 74.

Moreover, the display control unit 34 can display the superimposition image 82 in which the background image 74 and the two-dimensional original image 77 that is formed when the three-dimensional original image 73, which is formed by placing the original image 72 in the virtual area 75, is projected onto the two-dimensional space in such a way that the four vertices of the rectangular original image 72 match with the four vertices of the virtual area 75, are superimposed, on the display unit 20.

Meanwhile, the image processing device 10 according to the present embodiment can further include the receiving unit 24 and the auxiliary line calculating unit 28. The receiving unit 24 receives the movement start information indicating the start of the movement of the two-dimensional original image 77. When the movement start information is received, the auxiliary line calculating unit 28 calculates a plurality of auxiliary lines AL formed by extending the four sides of the two-dimensional original image 77 in the superimposition image 82. When the movement start information is received, the display control unit 34 displays the superimposition image 82 formed by superimposing the two-dimensional original image 77 and a plurality of auxiliary lines AL on the background image 74, on the display unit 20.

Moreover, the receiving unit 24 can receive the movement end information indicating the end of the movement of the two-dimensional original image 77. During the period of time between the reception of the movement start information and the reception of the movement end information, the superimposition image 82, in which the two-dimensional original image 77 and the auxiliary lines AL of the two-dimensional original image 77 are superimposed on the background image 74, is displayed on the display unit 20.

It is desirable that the display control unit 34 includes a first adjusting unit (the permeability control unit 34E), which adjusts the permeation rate of the two-dimensional original image 77 to be higher than the permeation rate of the background image 74 during the period of time between the reception of the movement start information and the reception of the movement end information.

It is desirable that the display control unit 34 includes a second adjusting unit (the blur control unit 34F), which adjusts the resolution of the two-dimensional original image 77 in such a way that, closer the two-dimensional original image 77 to the vanishing point VP in the background image 74, the further lower is the resolution of the two-dimensional original image 77 than the resolution of the background image 74.

The calculating unit 30 calculates the three-dimensional coordinates of the virtual area 75 in the virtual three-dimensional space S using the following: the projection matrix for projecting the original surface 54, which is formed when the original image 72 is temporarily placed at the predetermined reference position in the virtual three-dimensional space S, onto the two-dimensional space on the display surface of the display unit 20; the two-dimensional coordinates of the display area 80; and the original image 72. The display control unit 34 displays the superimposition image 82 in which the two-dimensional original image 77 that is formed when the three-dimensional original image 73, which is formed by placing the original image 72 in the virtual area 75, is projected onto the two-dimensional space visually confirmed from the viewpoint position I is superimposed, on the display unit 20.

Given below is the explanation of a hardware configuration of the image processing device 10.

Figure 18:
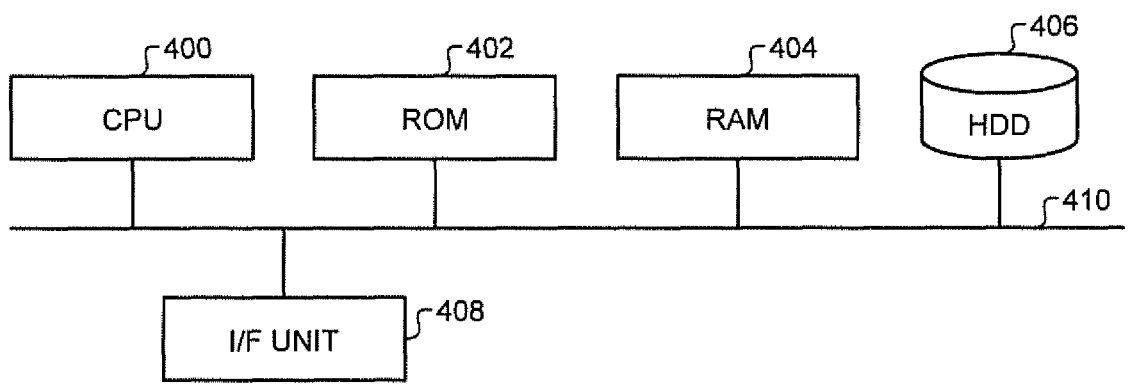
FIG. 18 is a hardware configuration diagram of the image processing device.

FIG. 18 is a hardware configuration diagram of the image processing device 10. In the hardware configuration of the image processing device 10, the following constituent elements are connected to each other by a bus 410: a CPU 400 that controls the entire device; a ROM 402 that is for storing a variety of data and various computer programs; a RAM 404 that is for storing a variety of data and various computer programs; an HDD 406 that is for storing a variety of data; and an interface (I/F) unit 408.

To the I/F unit 408 are connected a photographing unit and an UI unit such as a touch-sensitive panel having the input function and the display function.

The computer programs executed in the image processing device 10 according to the embodiment described above are stored as installable or executable files in a computer-readable recording medium such as a compact disk read only memory (CD-ROM), a flexible disk (FD), a compact disk recordable (CD-R), or a digital versatile disk (DVD); and are provided as a computer program product.

Alternatively, the computer programs executed in the image processing device 10 according to the embodiment described above can be stored in a downloadable manner in a computer that is connected to a network such as the Internet. Still alternatively, the computer programs executed in the image processing device 10 according to the embodiment described above can be distributed via a network such as the Internet.

Still alternatively, the computer programs executed in the image processing device 10 according to the embodiment described above can be stored in advance in the ROM 402.

The computer programs executed in the image processing device 10 according to the embodiment described above contain modules of the constituent elements described above. As far as the actual hardware is concerned, the CPU 400 reads the computer programs from the memory medium mentioned above and executes the computer programs, so that the constituent elements are loaded and generated in a main memory device.

According to an embodiment, the original image can be easily placed in a manner in accordance with the sense of perspective indicated in the background image.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing device including circuitry configured to perform a method comprising:
registering one or more original images in a storage device;
obtaining, by the circuitry, a background image to be displayed on a display device and an original image, amongst the registered images;
detecting, by the circuitry, a plurality of straight lines from the obtained background image;
selecting, by the circuitry, four reference straight lines amongst the detected plurality of straight lines, the four reference straight lines visually expressing a sense of perspective in the background image and forming respective sides of a four-side area in the background image, the detected plurality of straight lines including straight lines forming an outer frame of the background image and straight lines which are disposed on a two-dimensional surface reflected in the background image and are respectively extended in a two-dimensional plane of the two-dimensional surface to intersect at least one of the straight lines forming the outer frame of the background image;

determining, by the circuitry, a virtual area in a virtual three-dimensional space, the virtual area being a display area which corresponds to the four-sided area and which is disposed in the virtual three-dimensional space; and generating, by the circuitry, and displaying on the display device, a superimposition image in which the background image and a two-dimensional original image retrieved from amongst the original images registered in the storage device are superimposed, the two-dimensional original image being projected, from a predetermined viewpoint position, onto the determined virtual area in the virtual three-dimensional space.

2. The image processing device according to claim 1, wherein in the superimposition image generated by the circuitry, the two-dimensional original image is projected onto the virtual area in such a way that four vertices of the virtual area match with four vertices of the original image.

3. The image processing device according to claim 1, wherein the method performed by the circuitry further comprises:

receiving movement start information indicating start of movement of the two-dimensional original image;

calculating a plurality of auxiliary lines formed by extending four sides of the two-dimensional original image in the superimposition image, in response to the movement start information being received; and in response to the movement start information being received, superimposing the plurality of auxiliary lines on the background image, and displaying the superimposition image in which the two-dimensional original image and the plurality of auxiliary lines are superimposed on the background image, on the display device.

4. The image processing device according to claim 3, wherein the method performed by the circuitry further comprises:

receiving movement end information indicating end of movement of the two-dimensional original image; and during a period of time between reception of the movement start information and reception of the movement end information, displaying the superimposition image in which the two-dimensional original image and the plurality of auxiliary lines are superimposed on the background image, on the display device.

5. The image processing device according to claim 4, wherein the method performed by the circuitry further comprises:

adjusting, during the period of time between reception of the movement start information and reception of the movement end information, a permeation rate of the two-dimensional original image to be higher than a permeation rate of the background image.

6. The image processing device according to claim 1, wherein the method performed by the circuitry further comprises:

adjusting a resolution of the two-dimensional original image based on proximity of the two-dimensional original image to a vanishing point in the background image, wherein when the two-dimensional original image moves closer to the vanishing point in the background image, the resolution of the two-dimensional original image is adjusted to be lower, relative to a resolution of the background image.

7. The image processing device according to claim 1, wherein the method performed by the circuitry further comprises calculating three-dimensional coordinates of the virtual area m the virtual three-dimensional space using a projection matrix for projecting an original surface which is formed by temporarily placing the original image at a predetermined reference position in the virtual three-dimensional space, on a display surface of the display device, two-dimensional coordinates of the rectangular display area, and the original image; and displaying the superimposition image m which the background image and the two-dimensional original image are superimposed, on the display device, the two-dimensional original image being formed by projecting the three-dimensional original image which is formed by placing the original image at the calculated three-dimensional coordinates, onto the virtual area which is visually confirmed from a predetermined viewpoint position which is a position that is perpendicular with respect to the projected original surface.

8. An image processing method, comprising:

registering one or more original images in a storage device;

obtaining, by circuitry of an image processing device, a background image to be displayed on a display device and an original image, amongst the registered images;

detecting, by the circuitry, a plurality of straight lines from the obtained background image;

selecting, by the circuitry, four reference straight lines amongst the detected plurality of straight lines, the four reference straight lines visually expressing a sense of perspective in the background image and forming respective sides of a four-side area in the background image, the detected plurality of straight lines including straight lines forming an outer frame of the background image and straight lines which are disposed on a two-dimensional surface reflected in the background image and are respectively extended in a two-dimensional plane of the two-dimensional surface to intersect at least one of the straight lines forming the outer frame of the background image;

determining, by the circuitry, a virtual area in a virtual three-dimensional space, the virtual area being a display area which corresponds to the four-sided area and which is disposed in the virtual three-dimensional space; and generating, by the circuitry, and displaying on the display device, a superimposition image in which the background image and a two-dimensional original image retrieved from amongst the original images registered in the storage device are superimposed, the two-dimensional original image being projected, from a predetermined viewpoint position, onto the determined virtual area in the virtual three-dimensional space.

9. The image processing method according to claim 8, wherein the plurality of straight lines in the background image, which are respectively extended to intersect the outer frame of the background image, do not constitute the outer frame of the background image.

10. A non-transitory computer-readable medium including a computer program causing a computer to perform:

registering one or more original images, in a storage device;

obtaining, by the computer, a background image to be displayed on a display device and an original image, amongst the registered images;

detecting, by the computer, a plurality of straight lines from the obtained background image;

selecting, by the computer, four reference straight lines amongst the detected plurality of straight lines, the four reference straight lines visually expressing a sense of perspective in the background image and forming respective sides of a four-side area in the background image, the detected plurality of straight lines including straight lines forming an outer frame of the background image and straight lines which are disposed on a two-dimensional surface reflected in the background image and are respectively extended in a two-dimensional plane of the two-dimensional surface to intersect at least one of the straight lines forming the outer frame of the background image;

determining, by the computer, a virtual area in a virtual three-dimensional space, the virtual area being a display area which corresponds to the four-sided area and which is disposed in the virtual three-dimensional space; and generating by the computer, and displaying on the display device, a superimposition image in which the background image and a two-dimensional original image retrieved from amongst the original images registered in the storage device are superimposed, the two-dimensional original image being projected, from a predetermined viewpoint position, onto the determined virtual area in the virtual three-dimensional space.

* * * * *